United States Patent
Lee et al.

(10) Patent No.: US 11,861,163 B2
(45) Date of Patent: Jan. 2, 2024

(54) ELECTRONIC DEVICE AND METHOD FOR PROVIDING A USER INTERFACE IN RESPONSE TO A USER UTTERANCE

(71) Applicant: Samsung Electronics Co., Ltd., Suwon-si (KR)

(72) Inventors: Seungyup Lee, Suwon-si (KR); Bomi Kim, Suwon-si (KR); Jeewon Ahn, Suwon-si (KR); Minkyeong Lim, Suwon-si (KR); Joonyeong Choe, Suwon-si (KR); Jaehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 17/577,964

(22) Filed: Jan. 18, 2022

(65) Prior Publication Data

US 2022/0137811 A1 May 5, 2022

Related U.S. Application Data

(63) Continuation of application No. PCT/KR2020/007783, filed on Jun. 16, 2020.

(30) Foreign Application Priority Data

Aug. 2, 2019 (KR) .................. 10-2019-0094255

(51) Int. Cl.
*G06F 3/14* (2006.01)
*G06F 3/04886* (2022.01)
(Continued)

(52) U.S. Cl.
CPC ........ *G06F 3/04886* (2013.01); *G06F 3/0482* (2013.01); *G06F 3/04847* (2013.01); *G06F 9/451* (2018.02)

(58) Field of Classification Search
CPC ............ H04N 1/00403; H04N 1/00488; G06F 3/04886; G06F 3/0482; G06F 3/04847; G06F 3/14; G06F 9/451
See application file for complete search history.

(56) References Cited

U.S. PATENT DOCUMENTS 5,548,681 A * 8/1996 Gleaves .................. G10L 15/22
704/E15.04
8,311,838 B2 11/2012 Lindahl et al.
(Continued)

FOREIGN PATENT DOCUMENTS

JP 2019-125011 A 7/2019
KR 10-2017-0097622 A 8/2017
(Continued)

*Primary Examiner* — Alvin H Tan
(74) *Attorney, Agent, or Firm* — Jefferson IP Law, LLP

(57) ABSTRACT

An electronic device is provided. The electronic device includes a display, a communication circuit, a processor operatively connected to the display and the communication circuit, and a memory operatively connected to the processor. The memory stores instructions that, when executed, cause the processor to receive information about a time interval and user interface information, which are associated with a response to a user utterance input to a first external electronic device, from a second external electronic device through the communication circuit, to determine whether the display is in an active state within the time interval, and to provide a first user interface corresponding to the user interface information through the display based on the determination that the display is in the active state within the time interval.

13 Claims, 19 Drawing Sheets

(51) Int. Cl.
   *G06F 9/451*      (2018.01)
   *G06F 3/0482*     (2013.01)
   *G06F 3/04847*    (2022.01)

(56) References Cited

U.S. PATENT DOCUMENTS

| | | | |
|---|---|---|---|
| 9,215,314 | B2 | 12/2015 | Nagatomo |
| 9,990,177 | B2 | 6/2018 | Faaborg et al. |
| 10,452,348 | B2 * | 10/2019 | Peng ........................ G10L 13/02 |
| 10,489,111 | B2 | 11/2019 | Jeong |
| 2008/0133671 | A1 * | 6/2008 | Kalaboukis ............. H04L 51/00 |
| | | | 709/206 |
| 2011/0172994 | A1 | 7/2011 | Lindahl et al. |
| 2012/0258769 | A1 | 10/2012 | Nagatomo |
| 2016/0335052 | A1 | 11/2016 | Faaborg et al. |
| 2017/0358300 | A1 | 12/2017 | Laurens et al. |
| 2017/0364324 | A1 | 12/2017 | Lee et al. |
| 2017/0372189 | A1 | 12/2017 | Joo et al. |
| 2018/0285065 | A1 | 10/2018 | Jeong |
| 2018/0336905 | A1 | 11/2018 | Kim et al. |
| 2020/0057606 | A1 | 2/2020 | Jeong |
| 2020/0057607 | A1 | 2/2020 | Jeong |
| 2020/0285363 | A1 | 9/2020 | Moon et al. |

FOREIGN PATENT DOCUMENTS

| | | |
|---|---|---|
| KR | 10-2018-0109496 A | 10/2018 |
| KR | 10-2019-0014569 A | 2/2019 |
| KR | 10-2019-0081926 A | 7/2019 |

* cited by examiner

ELECTRONIC DEVICE AND METHOD FOR PROVIDING A USER INTERFACE IN RESPONSE TO A USER UTTERANCE

CROSS-REFERENCE TO RELATED APPLICATION(S)

This application is a continuation application, claiming priority under § 365(c), of an International application No. PCT/KR2020/007783, filed on Jun. 16, 2020, which is based on and claims the benefit of a Korean patent application number 10-2019-0094255, filed on Aug. 2, 2019, in the Korean Intellectual Property Office, the disclosure of which is incorporated by reference herein in its entirety.

BACKGROUND

1. Field

The disclosure relates to an electronic device and method for providing a user interface.

2. Description of Related Art

In addition to a conventional input method using a keyboard or a mouse, electronic devices have recently supported various input methods such as a voice input. For example, the electronic devices such as smart phones or tablet PCs may receive a user utterance and then may provide a service for performing an action corresponding to the received user utterance.

The speech recognition service is being developed based on a technology for processing a natural language. The technology for processing a natural language refers to a technology that grasps the intent of a user input (utterance) and generates the result matched with the intent to provide a user with the service.

In the meantime, in the case where visual information corresponding to a voice response is provided when the voice response to a user utterance is provided, an electronic device without a display may have hardware limitations.

The above information is presented as background information only to assist with an understanding of the disclosure. No determination has been made, and no assertion is made, as to whether any of the above might be applicable as prior art with regard to the disclosure.

SUMMARY

When a display is positioned at a location where it is difficult for a user to watch a display of an electronic device even though the electronic device such as a smart speaker is equipped with a display, visual information corresponding to a response to a user utterance may not be delivered effectively.

Aspects of the disclosure are to address at least the above-mentioned problems and/or disadvantages and to provide at least the advantages described below. Accordingly, an aspect of the disclosure is to provide an electronic device and system capable of effectively delivering visual information without depending on the user's location, by providing information about a user interface to a device capable of providing the user interface corresponding to a response to a user utterance.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication circuit, a processor operatively connected to the display and the communication circuit, and a memory operatively connected to the processor. The memory stores instructions that, when executed, cause the processor to receive information about a time interval and user interface information, which are associated with a response to a user utterance input to a first external electronic device, from a second external electronic device through the communication circuit, to determine whether the display is in an active state within the time interval, and to provide a first user interface corresponding to the user interface information through the display based on the determination that the display is in the active state within the time interval.

In accordance with another aspect of the disclosure, a method for providing a user interface of an electronic device is provided. The method includes receiving information about a time interval and user interface information, which are associated with a response to a user utterance input to a first external electronic device, from a second external electronic device, determining whether a display of the electronic device is in an active state within the time interval, and providing a first user interface corresponding to the user interface information through the display based on the determination that the display is in the active state within the time interval.

In accordance with another aspect of the disclosure, an electronic device is provided. The electronic device includes a display, a processor operatively connected to the display, and a memory operatively connected to the processor. The memory stores instructions that, when executed, cause the processor to output a response to a user utterance input to the electronic device, identify a user interface information associated with the response, to identify a time interval including a threshold time interval that is a specified time after a response time interval, during which the response is output, and the response time interval have expired, to determine whether the display is in an active state within the time interval, and to provide a first user interface corresponding to the user interface information through the display based on the determination that the display is in the active state within the time interval.

According to an embodiment of the disclosure, a user's convenience may be increased by providing a user interface, which is visual information corresponding to a response to a user utterance output from a first electronic device, in a second electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
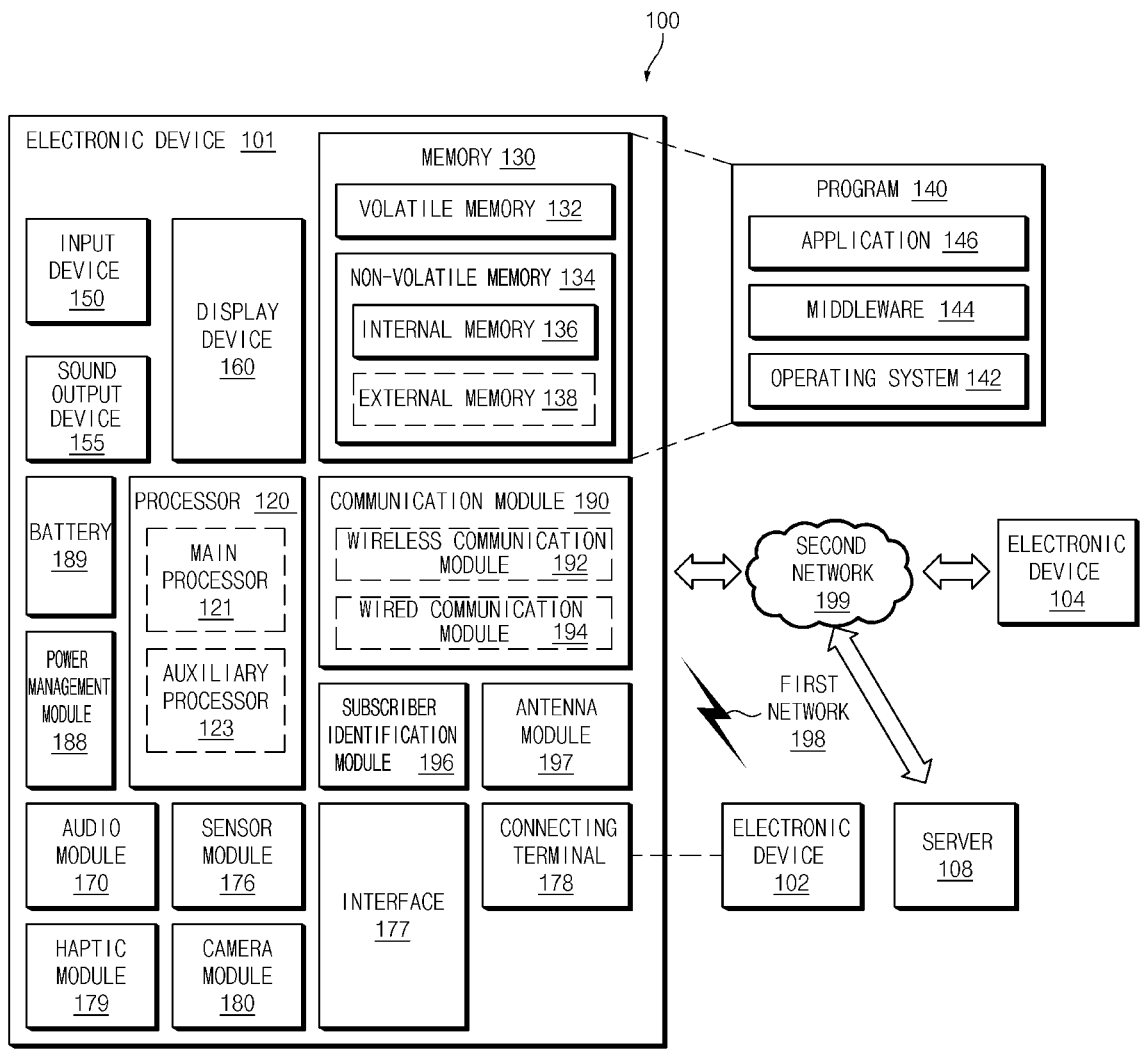
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102 and 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Hereinafter, an integrated intelligence system according to an embodiment disclosed in this specification will be described with reference to FIGS. 2 and 3.

Figure 2:
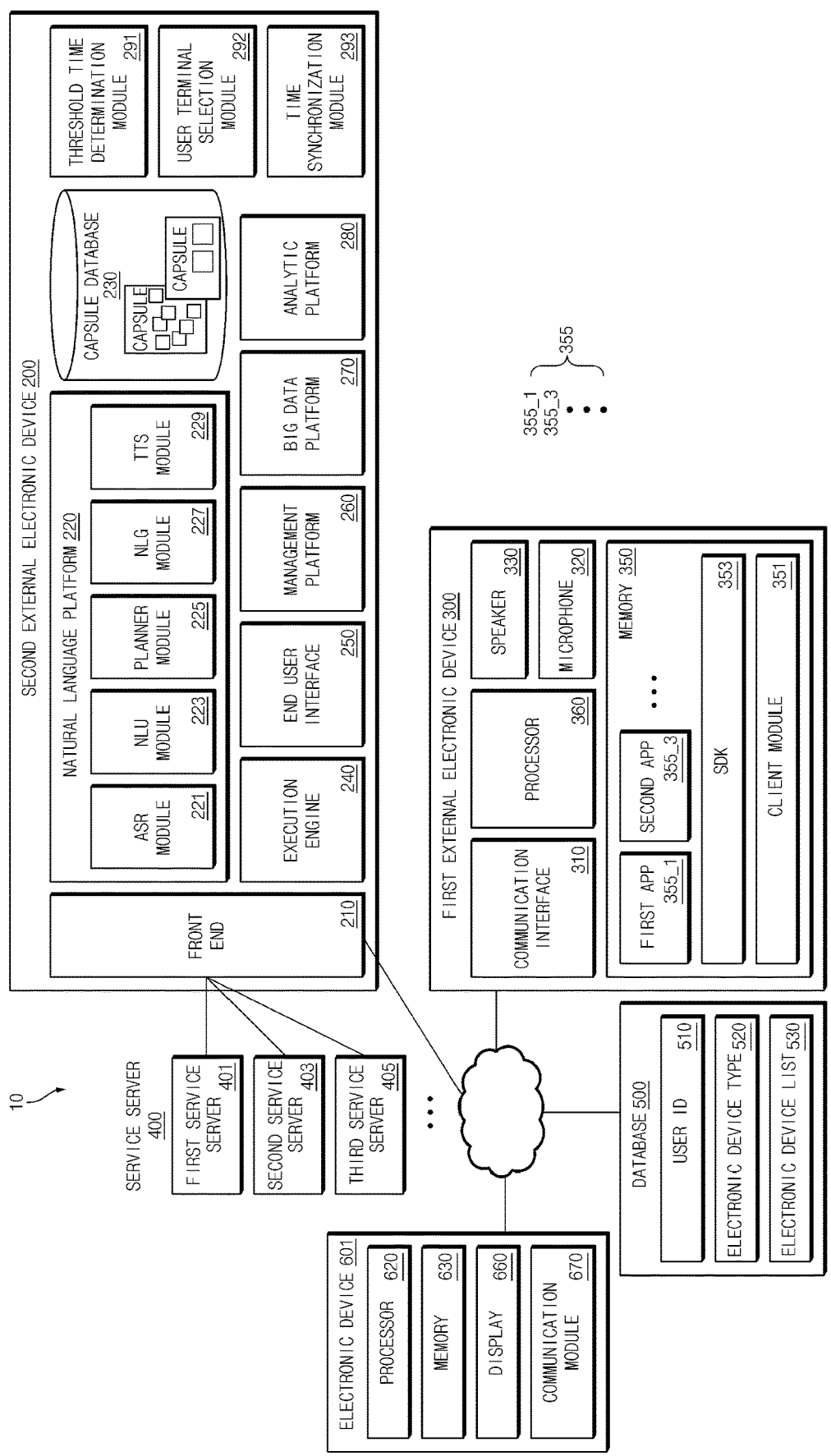
FIG. 2 is a block diagram illustrating an integrated intelligence system, according to an embodiment of the disclosure.

FIG. 2 is a block diagram illustrating an integrated intelligence system, according to an embodiment of the disclosure.

Referring to FIG. 2, an integrated intelligence system 10 may include an electronic device 601 (e.g., the electronic device 101 of FIG. 1), a first external electronic device 300, a second external electronic device 200, and a database 500.

According to an embodiment, the electronic device 601 may include, for example, a smartphone, a tablet PC, a wearable device, a home appliance, or a digital camera. The one electronic device 601 is illustrated in the drawing, but an embodiment is not limited thereto. For example, the plurality of external electronic devices 601 capable of communicating with the first external electronic device 300, the second external electronic device 200 and/or the database 500 may be included in the integrated intelligence system 10.

The second electronic device 601 may include a processor 620 (e.g., the processor 120 of FIG. 1), a memory 630 (e.g., the memory 130 of FIG. 1), a display 660 (e.g., the display device 160 of FIG. 1), and a communication module 670 (e.g., the communication module 190 of FIG. 1).

According to an embodiment, the processor 620 may be operatively coupled to the memory 630, and the display 660 to perform overall functions of the electronic device 601. For example, the processor 620 may include one or more processors. For example, the one or more processors may include an image signal processor (ISP), an application processor (AP), or a communication processor (CP).

According to an embodiment, the electronic device 601 includes the display 660, the communication module 670, the processor 620 operatively connected to the display and the communication module, and the memory 630 operatively connected to the processor. The memory stores instructions that, when executed, cause the processor to receive information about a time interval and user interface information, which are associated with a response to a user utterance input to a first external electronic device 300, from a second external electronic device 200 through the communication module, to determine whether the display is in an active state within the time interval, and to provide a first user interface corresponding to the user interface information through the display based on the determination that the display is in the active state within the time interval.

In an embodiment, the information about the time interval may include information about a response time interval, during which the response is output from the first external electronic device, and information about a threshold time interval that is a specified time after the response time interval has expired. The instructions may cause the processor to determine whether the display is in the active state within the response time interval and to determine whether the display is in the active state within the threshold time interval, based on the determination that the display is in an inactive state within the response time interval.

In an embodiment, the instructions may cause the processor to determine whether an application program is being executed in the electronic device, based on the determination that the display is in the active state within the time interval and to provide the user interface information and the first user interface corresponding to the application program through the display based on the determination that the application program is being executed.

In an embodiment, the instructions may cause the processor to provide the first user interface so as to overlap a part of the execution screen while the application program is executed and an execution screen of the application program is provided through the display.

In an embodiment, the instructions may cause the processor to display the first user interface on a first screen of the electronic device and to provide a second user interface, which is associated with content included in the response and which includes information corresponding to the user input, through the display, based on a user input for selecting a part of the first user interface, which is input to the electronic device.

In an embodiment, the instructions may cause the processor to display the first user interface on a first screen of the electronic device and to execute an application program associated with the response, based on a user input for selecting a part of the first user interface, which is input to the electronic device.

In an embodiment, the instructions may cause the processor, before providing the first user interface through the display, to transmit a request for determining whether the time interval has expired, to one of the first external electronic device or the second external electronic device, to receive feedback on the request from one of the first external electronic device or the second external electronic device, to determine whether the time interval has not expired, through the feedback, and to provide the first user interface corresponding to the user interface information through the display based on the determination that the display is in the active state within the time interval.

In an embodiment, the instructions may cause the processor, after displaying a second user interface on a first screen of the electronic device as the first user interface corresponding to the user interface information, to display a third user interface on a first screen of the electronic device and to display the second user interface on the first screen of the electronic device instead of the third user interface based on a fact that a user input to the third user interface is input to the electronic device.

According to an embodiment, a method for providing a user interface of the electronic device 601 includes receiving information about a time interval and user interface information, which are associated with a response to a user utterance input to a first external electronic device 300, from a second external electronic device 200, determining whether a display 660 of the electronic device is in an active state within the time interval, and providing a first user interface corresponding to the user interface information through the display based on the determination that the display is in the active state within the time interval.

In an embodiment, the information about the time interval may include information about a response time interval, during which the response is output from the first external electronic device, and information about a threshold time interval that is a specified time after the response time interval has expired. The determining of whether the display of the electronic device is in the active state within the time interval may include determining whether the display is in the active state within the response time interval and determining whether the display is in the active state within the threshold time interval, based on the determination that the display is in an inactive state within the response time interval.

In an embodiment, the providing of the first user interface corresponding to the user interface information through the display based on the fact that it is determined that the display is in the active state within the time interval may include determining whether an application program is being executed in the electronic device and providing the user interface information and the first user interface corresponding to the application program through the display based on the determination that the application program is being executed.

In an embodiment, the first user interface may be displayed on a first screen of the electronic device. The method may further include providing a second user interface, which is associated with content included in the response and which includes information corresponding to the user input, through the display, based on a user input for selecting a part of the first user interface, which is input to the electronic device.

In an embodiment, the first user interface may be displayed on a first screen of the electronic device. The method may further include executing an application program associated with the response based on a user input for selecting a part of the first user interface, which is input to the electronic device.

In an embodiment, the method may further include, before providing the first user interface through the display, transmitting a request for determining whether the time interval has expired, to one of the first external electronic device or the second external electronic device and receiving feedback on the request from one of the first external electronic device or the second external electronic device. The providing of the first user interface through the display may be based on the determination through the feedback that the time interval has not expired.

In an embodiment, the providing of the first user interface through the display may include displaying a third user interface on the first screen after displaying a second user interface on a first screen of the electronic device. The method may further include displaying the second user interface on the first screen of the electronic device instead of the third user interface based on a fact that a user input to the third user interface is input to the electronic device.

According to an embodiment, the electronic device 601 includes the display 660, the processor 620 operatively connected to the display, and a memory 630 operatively connected to the processor. The memory stores instructions that, when executed, cause the processor to output a response to a user utterance input to the electronic device, identify a user interface information associated with the response, to identify a time interval including a threshold time interval that is a specified time after a response time interval, during which the response is output, and the response time interval have expired, to determine whether the display is in an active state within the time interval, and to provide a first user interface corresponding to the user interface information through the display based on the determination that the display is in the active state within the time interval.

In an embodiment, the instructions may cause the processor to determine the threshold time interval based on content included in the response.

In an embodiment, the instructions may cause the processor to determine whether an application program is being executed in the electronic device, based on the determination that the display is in the active state within the time interval and to provide the user interface information and the first user interface corresponding to the application program through the display based on the determination that the application program is being executed.

In an embodiment, the instructions may cause the processor to display the first user interface on a first screen of the electronic device and to provide a second user interface, which is associated with content included in the response and which includes information corresponding to the user input, through the display, based on a user input for selecting a part of the user interface, which is input to the electronic device.

In an embodiment, the instructions may cause the processor to display the first user interface on a first screen of the electronic device and to execute an application program associated with the response, based on a user input for selecting a part of the first user interface, which is input to the electronic device.

The memory 630 may store commands, information, or data associated with operations of components included in the electronic device 601. For example, the memory 630 may store instructions, when executed, that cause the processor 620 to perform various operations described in the specification.

The display 660 may visually provide various pieces of information. The display 660 according to an embodiment may be configured to display an image or a video. The display 660 according to an embodiment may display the graphical user interface (GUI) of the running app (or an application program).

The display 660 may display a user interface corresponding to user interface information received from the second external electronic device 200. In an embodiment where the display 660 is a touch screen display, the display 660 may receive a touch input.

The electronic device 601 may communicate with the first external electronic device 300, the second external electronic device 200, and/or the database 500 through the communication module 670.

The electronic device 601 may further include an additional component in addition to the components illustrated in FIG. 2. For example, the electronic device 601 may include a communication module (not shown) or a connecting terminal (not shown) for communicating with the first external electronic device 300, the second external electronic device 200, and/or the database 500. According to an embodiment, the components of the electronic device 601 may be the same entities or may constitute separate entities.

The external electronic device 300 according to an embodiment may be a terminal device (or an electronic device) capable of connecting to Internet, and may be a smart speaker.

The first external electronic device 300 may include a communication interface 310, a microphone 320, a speaker 330, a memory 350, or a processor 360. The listed components may be operatively or electrically connected to one another.

The communication interface 310 according to an embodiment may be connected to an external device and may be configured to transmit or receive data to or from the external device. The microphone 320 according to an embodiment may receive a sound (e.g., a user utterance) to convert the sound into an electrical signal. The speaker 330 according to an embodiment may output the electrical signal as sound (e.g., voice).

The memory 350 according to an embodiment may store a client module 351, a software development kit (SDK) 353, and a plurality of apps 355. The client module 351 and the SDK 353 may constitute a framework (or a solution program) for performing general-purposed functions. Furthermore, the client module 351 or the SDK 353 may constitute the framework for processing a voice input.

According to an embodiment, the plurality of apps 355 may be programs for performing a specified function. According to an embodiment, the plurality of apps 355 may include a first app 355_1 and a second app 355_3. According to an embodiment, each of the plurality of apps 355 may include a plurality of actions for performing a specified function. For example, the plurality of apps 355 may include an alarm app, a message app, and/or a schedule app. According to an embodiment, the plurality of apps 355 may be executed by the processor 360 to sequentially execute at least part of the plurality of actions.

According to an embodiment, the processor 360 may control an overall operation of the first external electronic device 300. For example, the processor 360 may be electrically connected to the communication interface 310, the microphone 320, and the speaker 330 so as to perform a specified operation.

The processor 360 according to an embodiment may execute the program stored in the memory 350 so as to perform a specified function. For example, according to an embodiment, the processor 360 may execute at least one of the client module 351 or the SDK 353 so as to perform a following operation for processing a voice input that is a user utterance. The processor 360 may control operations of the plurality of apps 355 via the SDK 353. The following operation described as an operation of the client module 351 or the SDK 353 may be executed by the processor 360.

According to an embodiment, the client module 351 may receive a voice input that is a user utterance. For example, the client module 351 may receive a voice signal corresponding to a user utterance detected through the microphone 320. The client module 351 may transmit the received voice input to the second external electronic device 200. The client module 351 may transmit state information of the first external electronic device 300 to the second external electronic device 200 together with the received voice input. For example, the state information may be execution state information of an app.

According to an embodiment, the client module 351 may receive a response corresponding to the received voice input. For example, when the client module 351 is capable of generating a response corresponding to the voice input received from the second external electronic device 200, the client module 351 may receive a response corresponding to the received voice input.

According to an embodiment, the client module 351 may receive a plan corresponding to the received voice input.

When the first external electronic device 300 includes a display, the client module 351 may display a result of executing a plurality of operations of the app depending on the plan on a display. For example, the client module 351 may sequentially display the result of executing the plurality of actions on a display. For another example, the first external electronic device 300 may display only a part of results (e.g., a result of the last action) of executing the plurality of actions, on the display.

According to an embodiment, the client module 351 may receive a request for obtaining information necessary to calculate a response corresponding to a voice input, from the second external electronic device 200. According to an embodiment, the client module 351 may transmit necessary information to the second external electronic device 200 in response to the request.

The client module 351 according to an embodiment may transmit information as a result of executing a plurality of operations according to a plan to the second external electronic device 200. The second external electronic device 200 may identify that the received voice input is correctly processed, using the result information.

According to an embodiment, the client module 351 may include a speech recognition module. According to an embodiment, the client module 351 may recognize a voice input for performing a limited function, via the speech recognition module. For example, the client module 351 may launch an intelligence app that processes a voice input for performing an organic action, via a specified input (e.g., wake up!).

According to an embodiment, the second external electronic device 200 may receive information associated with a user's voice input from the first external electronic device 300 over a communication network. According to an embodiment, the second external electronic device 200 may convert data associated with the received voice input to text data. According to an embodiment, the second external electronic device 200 may generate a plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the second external electronic device 200 may transmit a response according to the generated plan to the first external electronic device 300 or may transmit the generated plan to the first external electronic device 300. According to an embodiment, the first external electronic device 300 may output a response according to the plan through the speaker 330. According to an embodiment, the first external electronic device 300 may output a result of executing an action according to the plan through the speaker 330 with voice.

According to an embodiment, the second external electronic device 200 may identify a response time interval that is a time required for a response to a user utterance to be output from the first external electronic device 300. The second external electronic device 200 may identify a threshold time interval that is a specified time after the response time interval has expired. The second external electronic device 200 may identify user interface information corresponding to the response. The second external electronic device 200 may transmit information about the response time interval, information about the threshold time interval, and user interface information to the electronic device 601.

The second external electronic device 200 according to an embodiment may include a front end 210, a natural language platform 220, a capsule database (DB) 230, an execution engine 240, an end user interface 250, a management platform 260, a big data platform 270, an analytic platform 280, a threshold time determination module 291, a user terminal selection module 292, or a time synchronization module 293.

According to an embodiment, the front end 210 may receive a voice input received from the first external electronic device 300. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech module (TTS) module 229.

According to an embodiment, the ASR module 221 may convert the voice input received from the first external electronic device 300 into text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 225 may generate the plan by using a parameter and the intent that is determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or a result value output by the execution of the plurality of actions. The parameter and the result value may be defined as a concept of a specified form (or class). As such, the plan may include the plurality of actions and a plurality of concepts, which are determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine an execution sequence of the plurality of actions, based on the parameters necessary to perform the plurality of actions and the result output by the execution of the plurality of actions. Accordingly, the planner module 225 may generate a plan including information (e.g., ontology) about the relationship between the plurality of actions and the plurality of concepts. The planner module 225 may generate the plan by using information stored in the capsule DB 230 storing a set of relationships between concepts and actions.

According to an embodiment, the NLG module 227 may change specified information into information in a text form. The information changed to the text form may be in the form of a natural language speech. The TTS module 229 according to an embodiment may change information in the text form to information in a voice form.

According to an embodiment, all or part of the functions of the natural language platform 220 may be also implemented in the first external electronic device 300 and/or the electronic device 601.

The capsule DB 230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 230 may store the plurality of capsules in a form of a concept action network (CAN). According to an embodiment, the plurality of capsules may be stored in the function registry included in the capsule DB 230.

The capsule DB 230 may include a strategy registry that stores strategy information necessary to determine a plan corresponding to a voice input. When there are a plurality of plans corresponding to the voice input, the strategy information may include reference information for determining one plan. According to an embodiment, the capsule DB 230 may include a follow-up registry that stores information of the follow-up action for suggesting a follow-up action to the user in a specified context. For example, the follow-up action may include a follow-up utterance. According to an embodiment, the capsule DB 230 may include a layout registry for storing layout information of the information output via the first external electronic device 300. According to an embodiment, the capsule DB 230 may include a vocabulary registry storing vocabulary information included in capsule information. According to an embodiment, the capsule DB 230 may include a dialog registry storing information about dialog (or interaction) with the user. The capsule DB 230 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set.

In an embodiment, the capsule database 230 may be implemented in the first external electronic device 300 and/or the electronic device 601.

According to an embodiment, the execution engine 240 may calculate a result by using the generated plan. The end user interface 250 may transmit the calculated result to the first external electronic device 300. Accordingly, the first external electronic device 300 may receive the result and may provide the user with the received result. According to an embodiment, the management platform 260 may manage information used by the second external electronic device 200. According to an embodiment, the big data platform 270 may collect data of the user. According to an embodiment, the analytic platform 280 may manage quality of service (QoS) of the second external electronic device 200. For example, the analytic platform 280 may manage the component and processing speed (or efficiency) of the second external electronic device 200.

According to an embodiment, the threshold time determination module 291 may identify user interface information corresponding to the calculated result including a response to a user utterance that is input to the first external electronic device 300. The user interface information may correspond to content of the response. The threshold time determination module 291 may identify a response time interval that is a time required for the response to be output from the first external electronic device 300. The threshold time determination module 291 may identify a threshold time interval that is a specified time after the response time interval has expired.

In an embodiment, the threshold time determination module 291 may determine a threshold time interval based on content included in the response. In an embodiment, the threshold time determination module 291 may determine the threshold time interval based on the user interface information corresponding to the response. In an embodiment, the threshold time determination module 291 may determine the threshold time interval based on a capsule associated with the generated plan. In an embodiment, the threshold time determination module 291 may determine the threshold time interval based on the type of an electronic device that will provide the user interface.

According to an embodiment, the user terminal selection module 292 may communicate with the first external electronic device 300 and may search for an electronic device (e.g., a smart phone or a smart watch) registered in the same user account as the first external electronic device 300. The user terminal selection module 292 may access the database 500 so as to obtain information about a user ID 510 associated with a user account, a type 520 of an electronic device, and an electronic device list 530. The user terminal selection module 292 may search for an electronic device by using the information obtained from the database 500.

In an embodiment, the database 500 may be implemented separately from the electronic device 601, the first external electronic device 300, and the second external electronic device 200. In an embodiment, unlike the illustration, the database 500 may be included in the electronic device 601, the first external electronic device 300, and/or the second external electronic device 200.

There may be a plurality of electronic devices found by the user terminal selection module 292. The user terminal selection module 292 may select at least one electronic device (e.g., the electronic device 601), which is capable of displaying a user interface corresponding to user interface information, from among a plurality of found electronic devices through a display.

The second external electronic device 200 may transmit information (e.g., information about a response time interval and information about a threshold time interval) about a time interval associated with a response and user interface information to the selected electronic device (e.g., the electronic device 601).

According to an embodiment, the second external electronic device 200 may transmit the information (e.g., information about the response time interval and information about the threshold time interval) about the time interval associated with the response and the user interface information to the selected electronic device (e.g., the electronic device 601). Afterward, when a user interface is provided through a display (e.g., the display 660), the time synchronization module 293 may synchronize the response output from the first external electronic device 300 with the user interface.

In an embodiment, the electronic device 601 may receive, from the second external electronic device 200, information about a time interval associated with a response to a user utterance and the user interface information associated with the response and then may provide a user interface corresponding to the user interface information through the display 660 based on a fact that it is identified that a display is activated within the time interval.

In an embodiment, when a user input is input to the electronic device 601 through the user interface, an additional interface may be displayed on the electronic device 601 by the user input. In an embodiment, content included in the response may be provided through the display 660. In an embodiment, an application program associated with the response may be executed in the electronic device 601.

In an embodiment, when a user input is input to the electronic device 601 through the user interface, the user input may be transmitted to the second external electronic device 200. The second external electronic device 200 may generate a response corresponding to the user input and then may deliver the response to the first external electronic device 300. The second external electronic device 200 may output a response corresponding to the user input. For example, in response to a user utterance saying that "please recommend a laundry detergent", the first external electronic device 300 may output the found laundry detergent information as a response, and the electronic device 601 may show the found laundry detergent and may provide a user interface including an object for purchasing the found laundry detergent through a display. When the user inputs a user input for selecting an object for a purchase through a user interface of the electronic device 601, the electronic device 601 may transmit a user input to the second external electronic device 200. The second external electronic device 200 may grasp the intent of the user input and may transmit a response saying that "I will proceed with the purchase" to the first external electronic device 300. In response to a user input to the electronic device 601, the first external electronic device 300 may output a response saying that "I will proceed with the purchase for the selected laundry detergent".

In this drawing, the threshold time determination module 291, the user terminal selection module 292, and the time synchronization module 293 are illustrated to be included in the second external electronic device 200, one by one. However, an embodiment is not limited thereto. For example, the threshold time determination module 291, the user terminal selection module 292, and the time synchronization module 293 may be included in the second external electronic device 200 such that the number of each of the threshold time determination module 291, the user terminal selection module 292, and the time synchronization module 293 corresponds to the number of capsules included in the capsule database 230.

According to an embodiment, a service server 400 may provide the first external electronic device 300 with a specified service (e.g., ordering food or booking a hotel). According to an embodiment, the service server 400 may be a server operated by the third party. According to an embodiment, the service server 400 may provide the second external electronic device 200 with information for generating a plan corresponding to the received voice input. The provided information may be stored in the capsule DB 230. Furthermore, the service server 400 may provide the second external electronic device 200 with result information according to the plan. The service server may include a plurality of service servers 401, 403 and 405.

In the above-described integrated intelligence system 10, the first external electronic device 300 may provide the user with various intelligent services in response to a user input. The user input may include, for example, an input through a physical button, a touch input, or a voice input.

According to an embodiment, the first external electronic device 300 may provide a speech recognition service via an intelligence app (or a speech recognition app) stored therein. In this case, for example, the first external electronic device 300 may recognize a user utterance or a voice input, which is received through a microphone, and may provide the user with a service corresponding to the recognized voice input.

According to an embodiment, the first external electronic device 300 may perform a specified operation, based on the received voice input, independently, or together with the second external electronic device 200 and/or the service server 400. For example, the first external electronic device 300 may launch an app corresponding to the received voice input and may perform the specified action via the executed app.

According to an embodiment, when providing a service together with the second external electronic device 200 and/or the service server 400, the first external electronic device 300 may detect a user utterance by using the microphone 320 and may generate a signal (or voice data) corresponding to the detected user utterance. The first external electronic device 300 may transmit the voice data to the second external electronic device 200 by using the communication interface 310.

According to an embodiment, the second external electronic device 200 may generate a plan for performing a task corresponding to the voice input or a result of performing an action depending on the plan, as a response to the voice input received from the first external electronic device 300. For example, the plan may include a plurality of actions for performing a task corresponding to the voice input of the user and a plurality of concepts associated with the plurality of actions. The concept may define a parameter to be input upon executing the plurality of actions or a result value output by the execution of the plurality of actions. The plan may include relationship information between the plurality of actions and the plurality of concepts.

According to an embodiment, the first external electronic device 300 may receive the response by using the communication interface 310. The first external electronic device 300 may output a voice signal generated inside the first external electronic device 300 to the outside by using the speaker 330.

Figure 3:
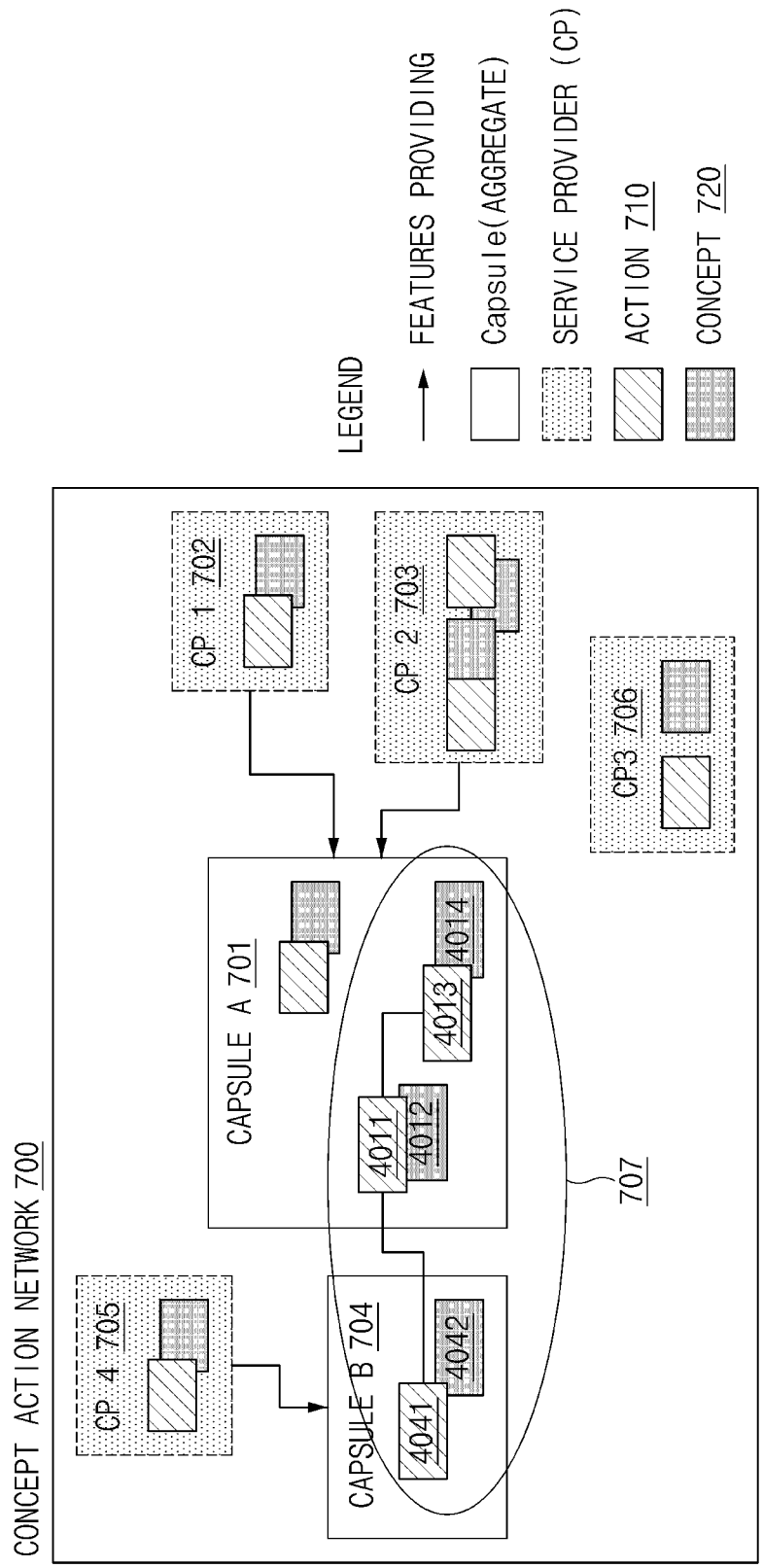
FIG. 3 is a diagram illustrating a form in which relationship information between a concept and an action is stored in a database, according to an embodiment of the disclosure.

FIG. 3 is a diagram illustrating a form in which relationship information between a concept and an action is stored in a database, according to an embodiment of the disclosure.

Referring to FIG. 3, a capsule database (e.g., the capsule DB 230) of the second external electronic device 200 may store a capsule in the form of a CAN 700. The capsule DB may store an action for processing a task corresponding to a user's voice input and a parameter necessary for the action, in the CAN form.

The capsule DB may store a plurality capsules (a capsule A 701 and a capsule B 704) respectively corresponding to a plurality of domains (e.g., applications). According to an embodiment, one capsule (e.g., the capsule A 701) may correspond to one domain (e.g., a location (geo) or an application). Furthermore, at least one service provider (e.g., CP 1 702 or CP 2 703) for performing a function for a domain associated with the capsule may correspond to one capsule. According to an embodiment, the single capsule may include at least one or more actions 710 and at least one or more concepts 720 for performing a specified function.

The natural language platform 220 may generate a plan for performing a task corresponding to the received voice input, using the capsule stored in a capsule database. For example, the planner module 225 of the natural language platform may generate the plan by using the capsule stored in the capsule database. For example, a plan 707 may be generated by using actions 4011 and 4013 and concepts 4012 and 4014 of the capsule A 701 and an action 4041 and a concept 4042 of the capsule B 704. The capsule B 704 may receive information from CP 4 705. The CAN 700 may also include CP 3 706.

In an embodiment, unlike the illustration of FIG. 2, modules included in the first external electronic device 300 and the second external electronic device 200 may be implemented in the electronic device 601.

Hereinafter, the operation of an electronic device according to an embodiment disclosed in this specification will be described with reference to FIG. 4. For clarity of description, details the same as the above-described details are briefly described or omitted.

Figure 4:
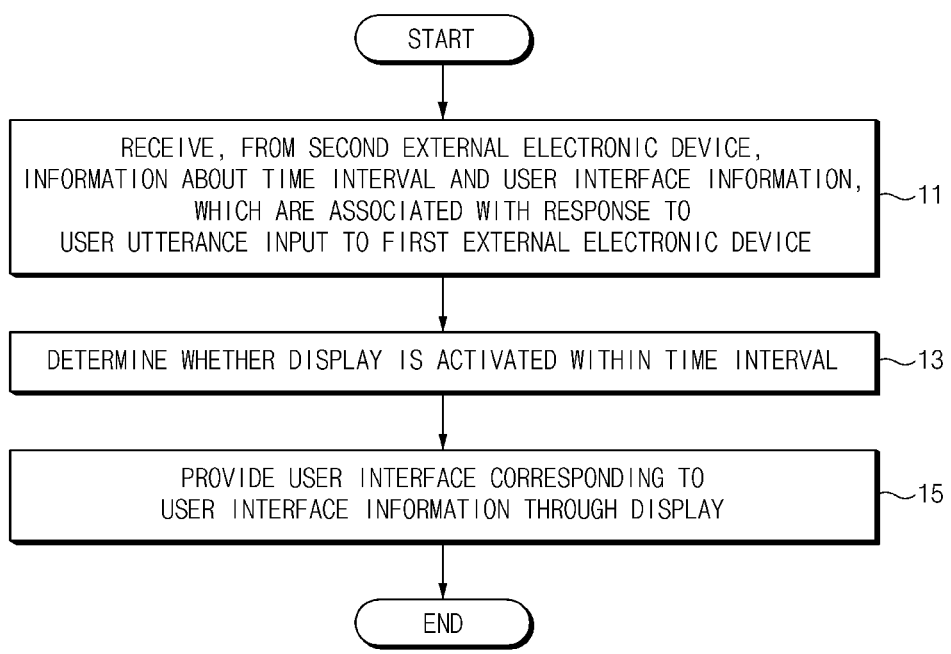
FIG. 4 is a flowchart for describing a method, in which an electronic device provides a user interface, according to an embodiment of the disclosure.

FIG. 4 is a flowchart for describing a method, in which an electronic device (e.g., a processor) provides a user interface, according to an embodiment of the disclosure.

Below, it is assumed that the electronic device 601 of FIG. 2 performs a process of FIG. 4. The operation described as being performed by the electronic device 601 may be implemented with instructions capable of being performed (or executed) by the processor 620 of the electronic device 601. The instructions may be stored in, for example, a computer-readable recording medium or the memory 630 of the electronic device illustrated in FIG. 2.

Referring to FIG. 4, in operation 11, an electronic device (e.g., the electronic device 601 and/or the processor 620 of FIG. 2) according to the embodiment disclosed in this specification may receive, from a second external electronic device (e.g., the second external electronic device 200 of FIG. 2), information about a time interval associated with a response to a user utterance input to a first external electronic device (e.g., the first external electronic device 300 of FIG. 2) and user interface information associated with the response.

For example, the information about the time interval associated with the response may include information about a response time interval and information about a threshold time interval.

For example, the information about the response time interval may include time information required to be output from the first external electronic device (e.g., the speaker 330 in FIG. 2) in response to a user utterance input to the first external electronic device. The electronic device may identify the response time interval by receiving information about the response time interval from the second external electronic device.

For example, the information about the threshold time interval may include information about a specified time after the response time interval has expired. The electronic device may identify the threshold time interval by receiving information about the threshold time interval from the second external electronic device.

For example, the user interface information associated with the response may be associated with a user interface capable of visually providing a user with content included in the response.

In operation 13, the electronic device may determine whether a display of the electronic device is activated within a time interval. For example, when the display is activated within the threshold time interval even though the display is inactive within the response time interval, the electronic device may identify that the display is activated within the time interval.

In operation 15, the electronic device may provide a user interface corresponding to user interface information through a display based on a fact that the display is active within the time interval. In an embodiment, the electronic device may display the user interface on a first screen of the electronic device.

In an embodiment, the first screen may be a lock screen. For example, when the user sets a lock on an electronic device, the first screen may be a lock screen provided through a display before an authentication input for unlocking the lock is input to the electronic device.

In an embodiment, the first screen may be a home screen. For example, when the user does not set a lock on the electronic device, the first screen may be a home screen.

In an embodiment, the first screen may be a screen provided before the home screen. For example, when the user has not set a lock on the electronic device, the first screen may be a screen provided before the home screen is provided when the user switches a state of a display to an active state. In this case, a user may access the home screen by inputting a touch input and/or swipe input without needing to input a separate authentication input to the first screen.

In an embodiment, when an application program is executed on an electronic device and the execution screen of the application program is provided through the display, the electronic device may provide a user interface so as to overlap a part of the execution screen.

Hereinafter, an operation of an integrated intelligence system (e.g., the integrated intelligence system 10 of FIG. 2) including an electronic device disclosed in this specification will be described with reference to FIGS. 5A, 5B, 6A, 6B, 6C, 6D, 6E, 7A, 7B, 8A, and 8B. For clarity of description, details the same as the above-described details are omitted.

Figure 5A:
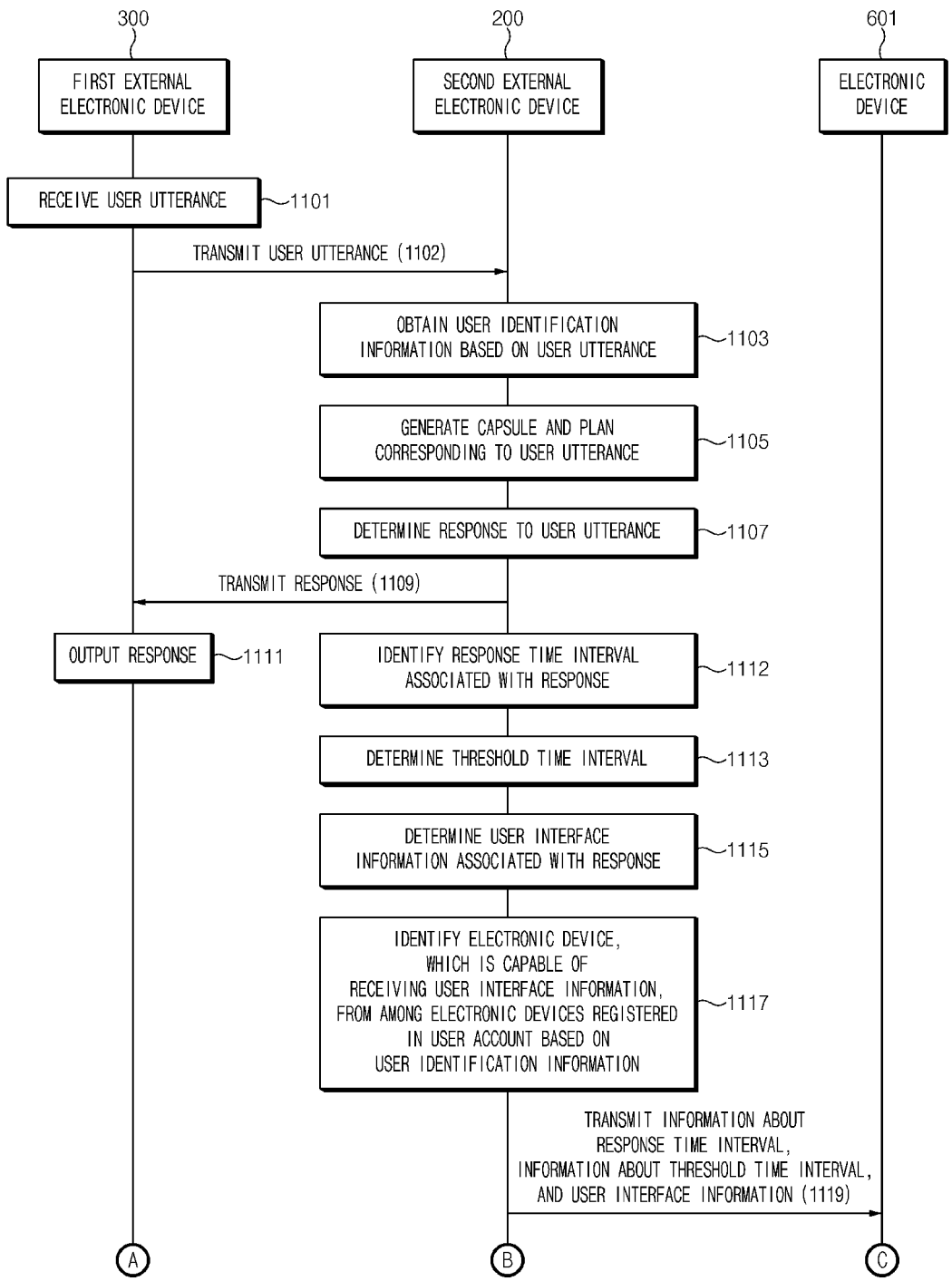
FIG. 5A is a sequence diagram for describing a method for providing a user interface corresponding to a response, according to an embodiment of the disclosure.
Figure 5B:
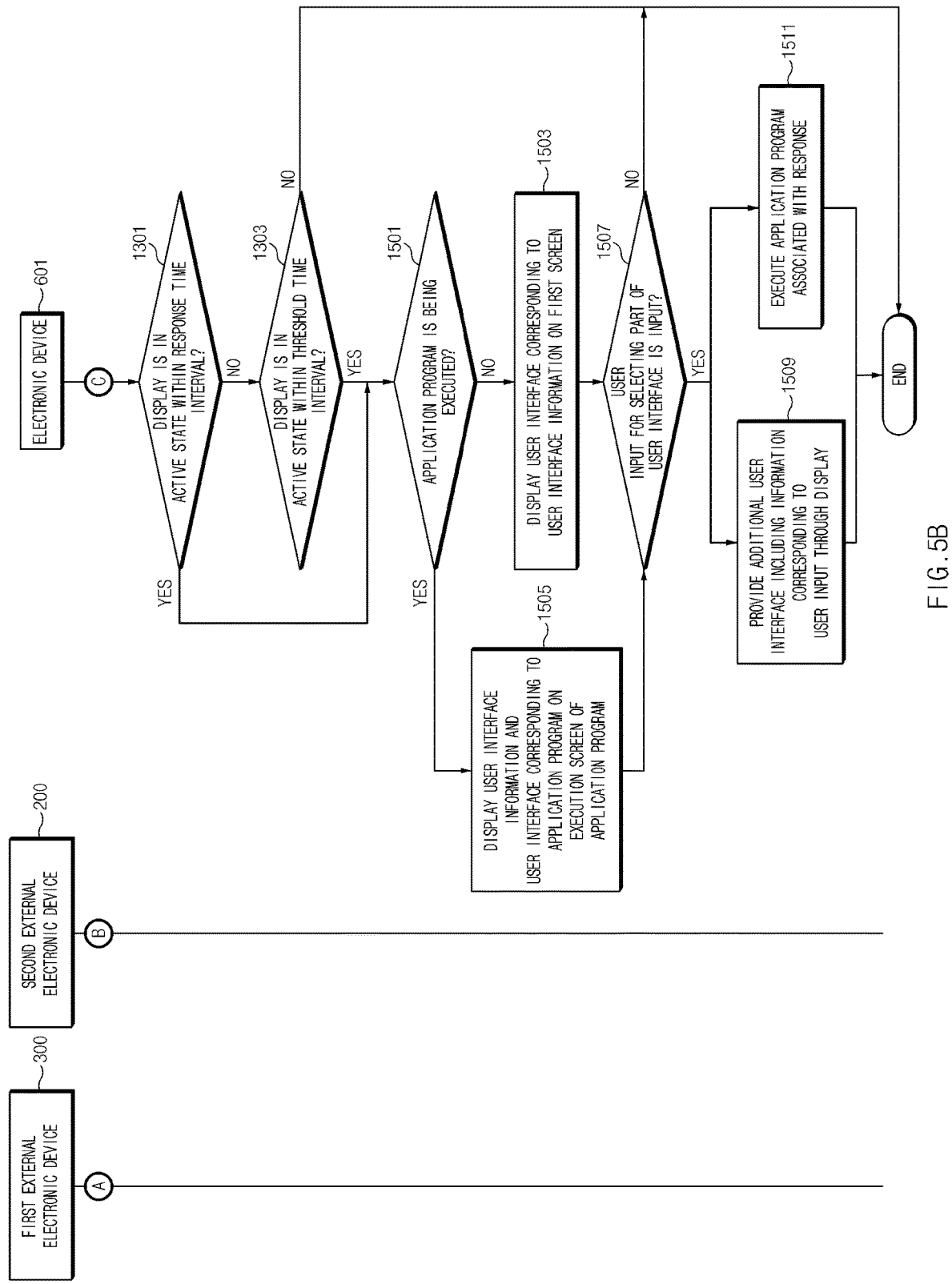
FIG. 5B is a sequence diagram for describing a method for providing a user interface corresponding to a response, according to an embodiment of the disclosure.

FIGS. 5A and 5B are sequence diagrams for describing a method for providing a user interface corresponding to a response, according to various embodiments of the disclosure.

Hereinafter, it is assumed that the first external electronic device 300, the second external electronic device 200, and the electronic device 601 of FIG. 2 perform the process of FIGS. 5A and 5B. The operation described as being performed by the first external electronic device 300, the second external electronic device 200, and the electronic device 601 may be implemented by using instructions capable of being performed (or executed) by each of the processor 360 of the first external electronic device 300, modules included in the second external electronic device 200, and the processor 620 of the electronic device 601. The instructions may be stored in, for example, a computer-readable recording medium or the memory 350 of the first external electronic device 300, the second external electronic device 200, and the memory 630 of the electronic device 601 illustrated in FIG. 2.

Referring to FIG. 5A, in operation 1101, the first external electronic device 300 may receive a user utterance. For example, the first external electronic device 300 may receive a user's voice input entered through the microphone 320.

In operation 1102, the first external electronic device 300 may transmit a user utterance to the second external electronic device 200.

In operation 1103, the second external electronic device 200 may obtain user identification information based on the received user utterance. For example, the second external electronic device 200 may access a database (e.g., the database 500 of FIG. 2) and then may obtain a user ID (e.g., the user ID 510 of FIG. 2).

In operation 1105, the second external electronic device 200 may generate a capsule and a plan, which correspond to the user utterance. For example, as described with reference to FIG. 2, the second external electronic device 200 may generate the capsule and the plan.

In operation 1107, the second external electronic device 200 may determine a response to the user utterance. The second external electronic device 200 may determine the response to the user utterance based on the generated plan.

In operation 1109, the second external electronic device 200 may transmit the response to the first external electronic device 300.

In operation 1111, the first external electronic device 300 may output the response. In an embodiment where the response is a voice output, the first external electronic device 300 may output the response through the speaker 330.

In operation 1112, the second external electronic device 200 may identify a response time interval associated with the response. The second external electronic device 200 may identify the response time interval that is a time required for the response transmitted to the first external electronic device 300 to be output from the first external electronic device 300.

In operation 1113, the second external electronic device 200 may determine a threshold time interval associated with the response. The second external electronic device 200 may determine a threshold time interval that is a specified time after the response is output from the first external electronic device 300. In an embodiment, the second external electronic device 200 may determine the threshold time interval based on content included in the response. In an embodiment, the second external electronic device 200 may determine the threshold time interval based on the user interface information corresponding to the response. In an embodiment, the second external electronic device 200 may determine the threshold time interval based on a capsule associated with the generated plan. In an embodiment, the second external electronic device 200 may determine the threshold time interval based on the type of an electronic device that will provide a user interface.

In operation 1115, the second external electronic device 200 may determine user interface information associated with the response. In an embodiment, the user interface information may be a deep link.

In operation 1117, the second external electronic device 200 may identify an electronic device, which is capable of receiving the user interface information, from among electronic devices registered in the same user account as the first external electronic device 300 based on the user identification information obtained in operation 1103. The second external electronic device 200 may identify an electronic device, which is capable of providing a user interface corresponding to the user interface information, from among electronic devices through a display.

When the identified electronic device is the electronic device 601, in operation 1119, the second external electronic device 200 may transmit the information about the response time interval, the information about the threshold time interval, and the user interface information to the electronic device 601. The electronic device 601 may receive information (e.g., information about a response time interval and information about a threshold time interval) about a time interval associated with a response and the user interface information (e.g., operation 11 of FIG. 4).

Figure 6A:
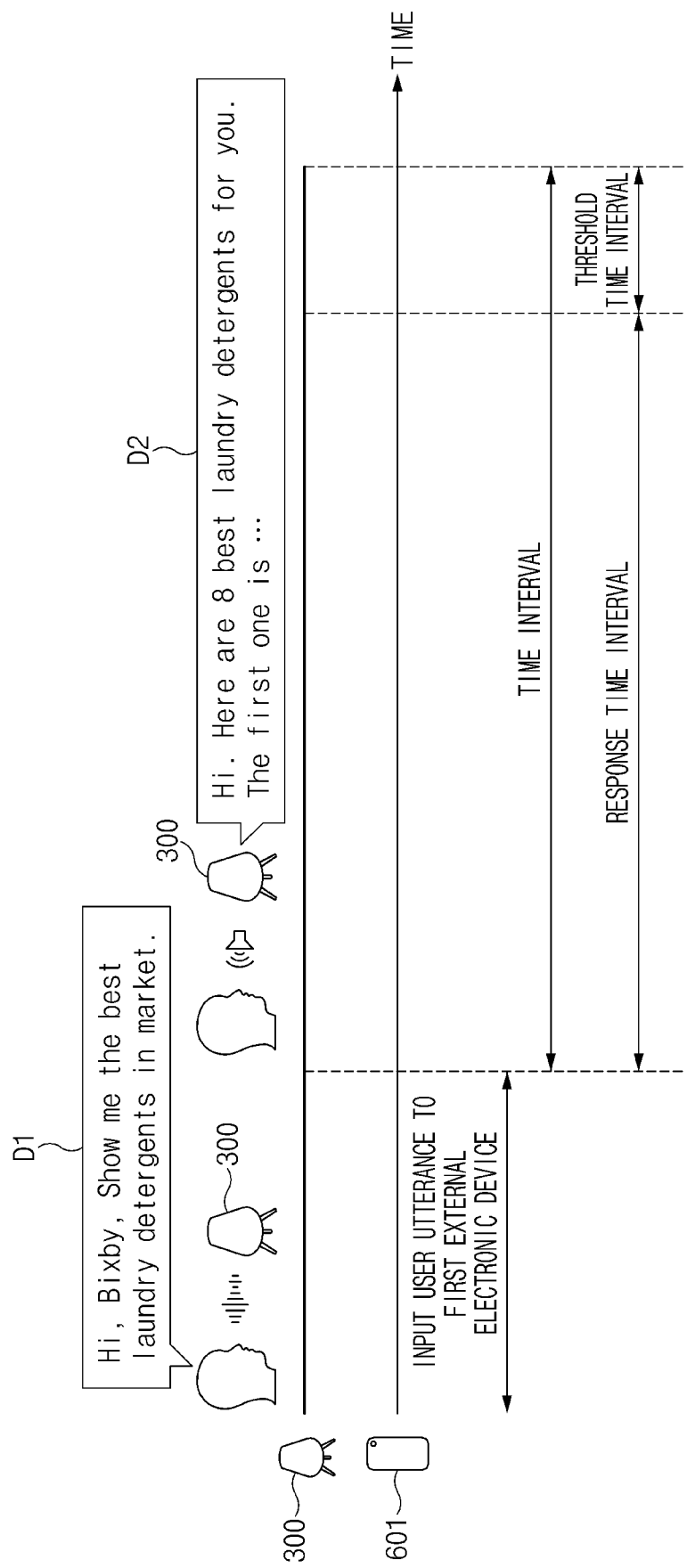
FIG. 6A is a diagram for describing a time interval associated with a response, according to an embodiment of the disclosure.

FIG. 6A is a diagram for describing a time interval associated with a response, according to an embodiment of the disclosure.

Referring to FIGS. 5B and 6A, in operation 1301, the electronic device 601 may identify whether a display (e.g., the display 660 of FIG. 2) is in an active state within a response time interval. During the response time interval, the first external electronic device 300 may output a response to a user utterance.

For example, the inactive state of the display may be a state where an always-on-display mode is being executed through the display. For example, the inactive state of the display may be a state where no content is provided through the display. For example, the active state of the display may be a state where a first screen is provided through the display. For example, the active state of the display may be a state where the electronic device 601 recognizes that a user lifts the electronic device 601 and provides the first screen in the inactive state of the display. For example, the active state of the display may be a state where the first screen is provided through the display when the user applies a touch input to the touch screen display of the electronic device 601, or the user presses an input button of the electronic device 601. In an embodiment where the first screen is a lock screen, for example, the active state of the display may be a state where the lock screen of the electronic device 601 is unlocked and then a home screen is provided through the display, or a specific application program is running.

For example, the user may input a user utterance D1 saying that "Hi Bixby. Show me the best laundry detergents in market" into the first external electronic device 300. The first external electronic device 300 may transmit a user utterance to the second external electronic device 200 (e.g., operation 1102 of FIG. 5A), may receive a response to the user utterance from the second external electronic device 200 (e.g., operation 1109 of FIG. 5A), and may output the response. (e.g., operation 1111 of FIG. 5A). For example, the first external electronic device 300 may output a response D2 saying that "Hi! Here are 8 best laundry detergents for you. The first one is . . . " during the response time interval.

In operation 1303, the electronic device 601 may identify whether the display is in an active state within a threshold time interval based on a fact that the display is in an inactive state within the response time interval.

When the display is in an inactive state within the threshold time interval, a process may be terminated. Operation 1301 and operation 1303 may correspond to operation 13 of FIG. 4.

Referring to FIG. 5B, in operation 1501, the electronic device 601 may determine whether an application program is being executed in the electronic device 601, based on a fact that the display is in the active state (e.g., 'YES' in operation 1301) within the response time interval, or a fact that the display is in the active state (e.g., 'YES' in operation 1303) within the threshold time interval.

In operation 1503, the electronic device 601 may display a user interface corresponding to user interface information on the first screen of the electronic device 601 based on the determination that the application program is not being executed (e.g., 'NO' in operation 1501).

Figure 6B:
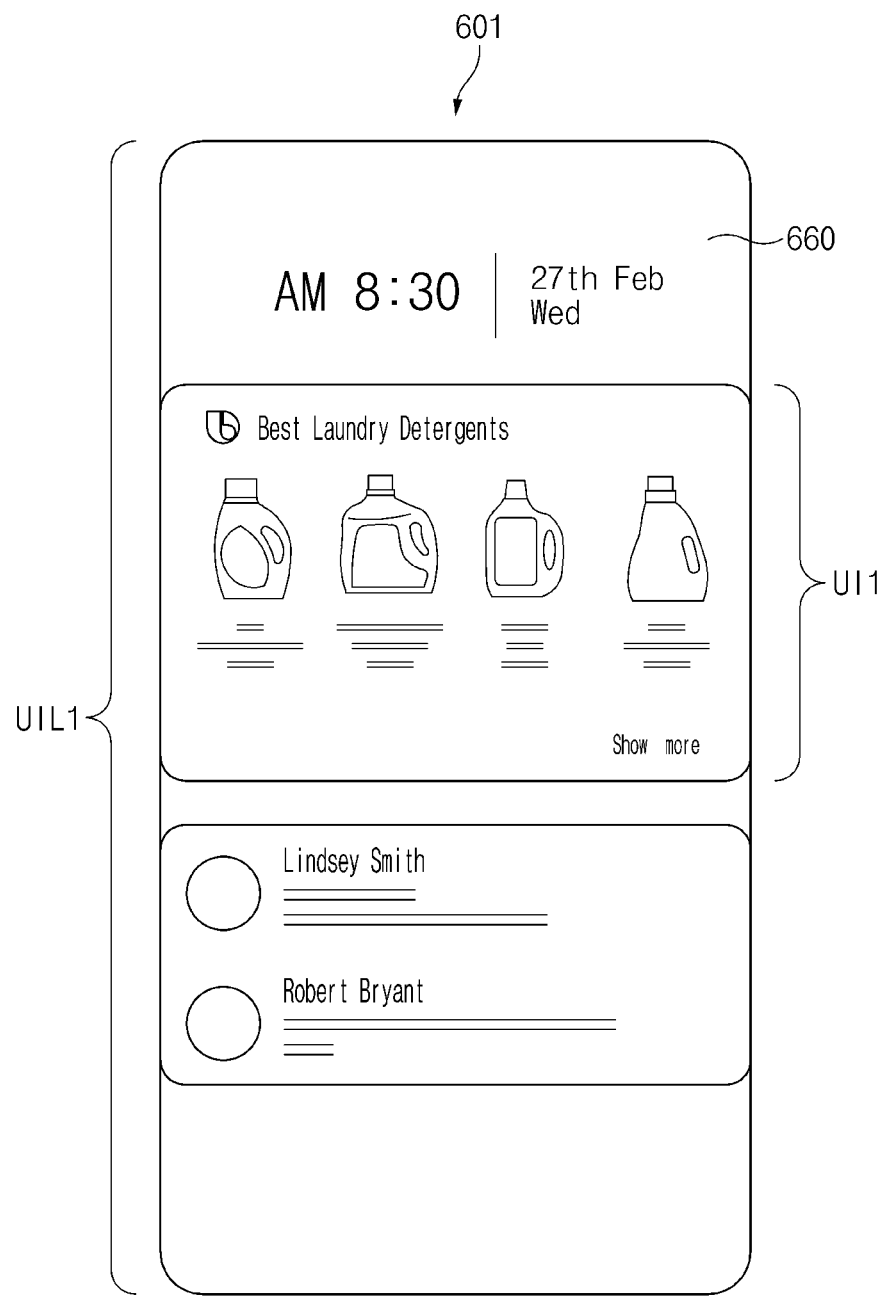
FIG. 6B is a diagram for describing a user interface corresponding to user interface information provided by an electronic device, according to an embodiment of the disclosure.
Figure 6C:
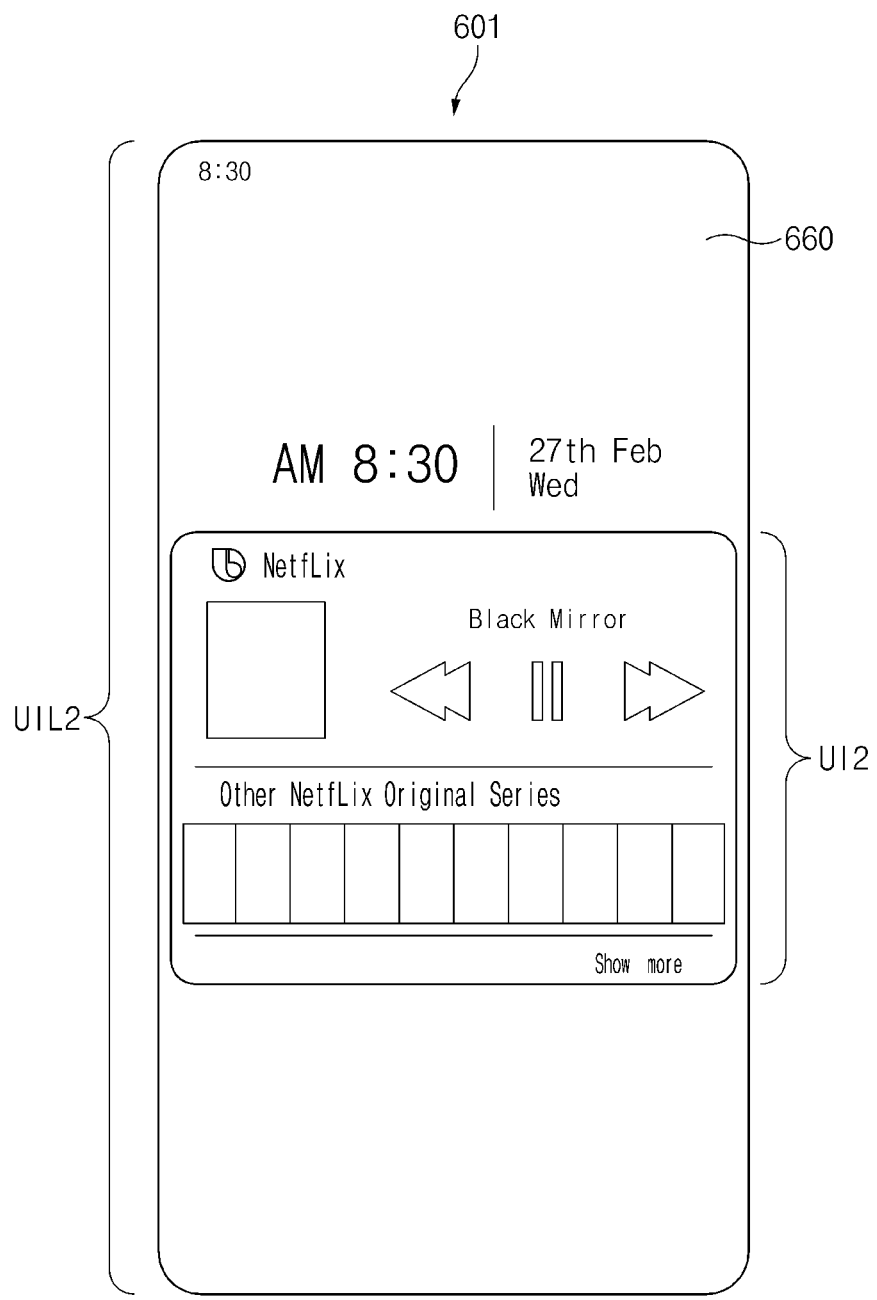
FIG. 6C is a diagram for describing a user interface corresponding to user interface information provided by an electronic device, according to an embodiment of the disclosure.

FIGS. 6B and 6C are diagrams for describing a user interface corresponding to user interface information provided by an electronic device, according to various embodiments of the disclosure.

Referring to FIG. 6B, the display of the electronic device 601 may be in an active state, and the electronic device 601 may be in a state where a first screen UIL1 is displayed through the display 660. For example, the electronic device 601 may provide a first user interface UI1 associated with the response D2 of FIG. 6A through the display 660. For example, when the first external electronic device 300 outputs a response (e.g., D2 in FIG. 6A) saying that "Hi! Here are 8 best laundry detergents for you. The first one is . . . ", the electronic device 601 may receive user interface information including content associated with the found laundry detergent from the second external electronic device 200. The electronic device 601 may provide a first user interface UI1 corresponding to user interface information through the display 660 on the first screen UIL1.

In the drawings, it is described that the electronic device 601 is a smart phone, but is not limited thereto. In an embodiment, when the electronic device 601 is a smart watch, the first user interface UI1 may be provided through a display of the smart watch.

Referring to FIG. 6C, the display 660 of the electronic device 601 may be in an active state, and the electronic device 601 may be in a state where a first screen UIL2 is displayed through the display 660. The electronic device 601 may provide a second user interface UI2 capable of controlling a response output from the first external electronic device 300 through the display 660. In an embodiment, when media content (e.g., 'Black Mirror') is being played in response to a user utterance through the first external electronic device 300 as a response, the electronic device 601 may provide the second user interface UI2 for controlling the media content being played through the display 660.

Referring to FIGS. 6B and 6C, the first screen (UIL1, UIL2) may be either a lock screen or a screen provided before a home screen is provided.

Referring to FIG. 5B, in operation 1505, the electronic device 601 may display user interface information and a user interface corresponding to an application program on an execution screen of the application program based on the determination that the application program is running (e.g., 'YES' in operation 1501). The user interface may include content, which correspond to the user interface information and which is associated with a response. Besides, the user interface may correspond to the running application program and may be provided to overlap a part of the execution screen of the application program.

Figure 6D:
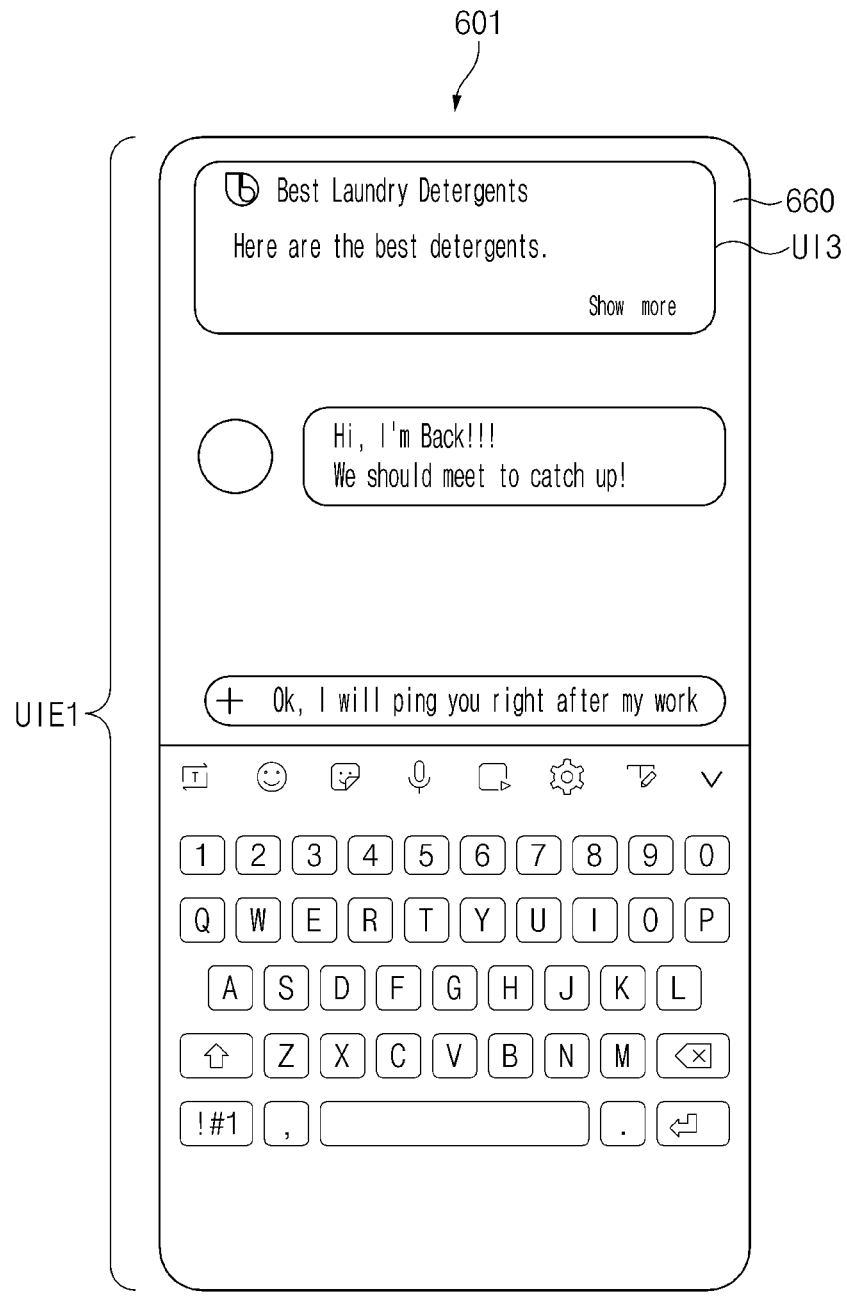
FIG. 6D is a diagram for describing a user interface corresponding to user interface information provided by an electronic device, according to an embodiment of the disclosure.
Figure 6E:
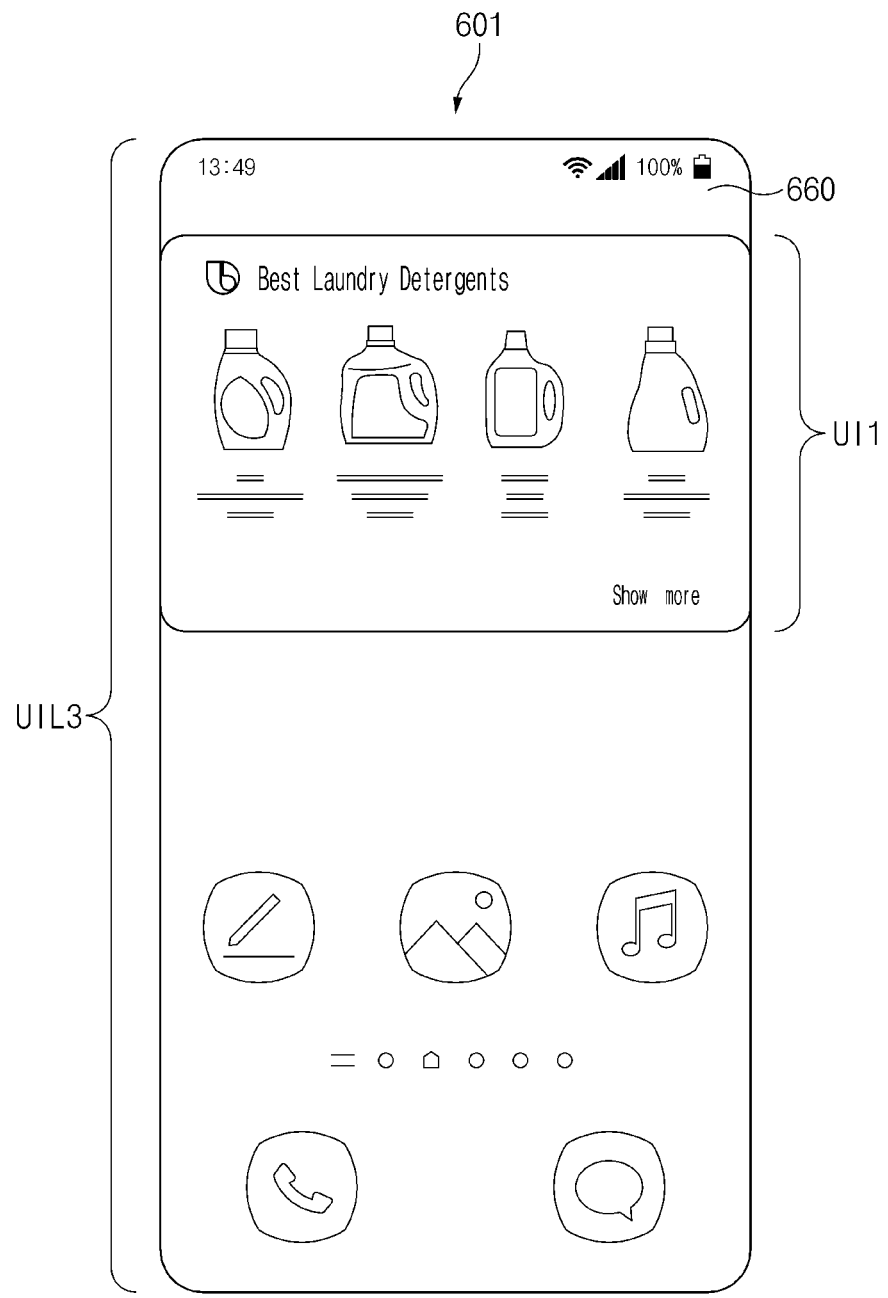
FIG. 6E is a diagram for describing a user interface corresponding to user interface information provided by an electronic device, according to an embodiment of the disclosure.

FIGS. 6D and 6E are diagrams for describing a user interface corresponding to user interface information provided by an electronic device, according to various embodiments of the disclosure.

Referring to FIG. 6D, the display 660 of the electronic device 601 may be in an active state, and may be in a state where a text message application program is running in the electronic device 601. The electronic device 601 may provide an execution screen UIE1 of the text message application program through the display 660. The first screen may be the execution screen UIE1 of the text message application program.

In an embodiment, the electronic device 601 may provide a third user interface UI3 so as to overlap a part of the execution screen UIE1 of the text message application program. In an embodiment, the electronic device 601 may provide the third user interface UI3 at the upper end of the display 660 of the electronic device 601 in a form of a notification.

Referring to FIG. 6E, the first screen may be a home screen. When the first screen is a home screen UIL3, the electronic device 601 may provide the first user interface UI1 through the display 660 so as to partially overlap the home screen UIL3. However, an embodiment is not limited thereto. The electronic device 601 may provide the first user interface UI1 as a part of a screen displayed through the display 660 in response to a swipe input from the upper end to a lower end of the display 660 to the home screen UIL3. In this case, the first user interface UI1 may partially overlap the home screen UI3 and may be provided through the display 660. Referring to FIG. 5B, after providing the user interface through the display, in operation 1507, the electronic device 601 may determine whether a user input for selecting at least part of the user interface is input.

When the user input is not input (e.g., 'NO' in operation 1507), a process may be terminated.

In operation 1509, the electronic device 601 according to an embodiment may provide an additional user interface including information corresponding to a user input through the display 660, based on a fact that the user input is input (e.g., 'YES' in operation 1507). For example, a user interface including information corresponding to a user input may be associated with content included in a response.

Figure 7A:
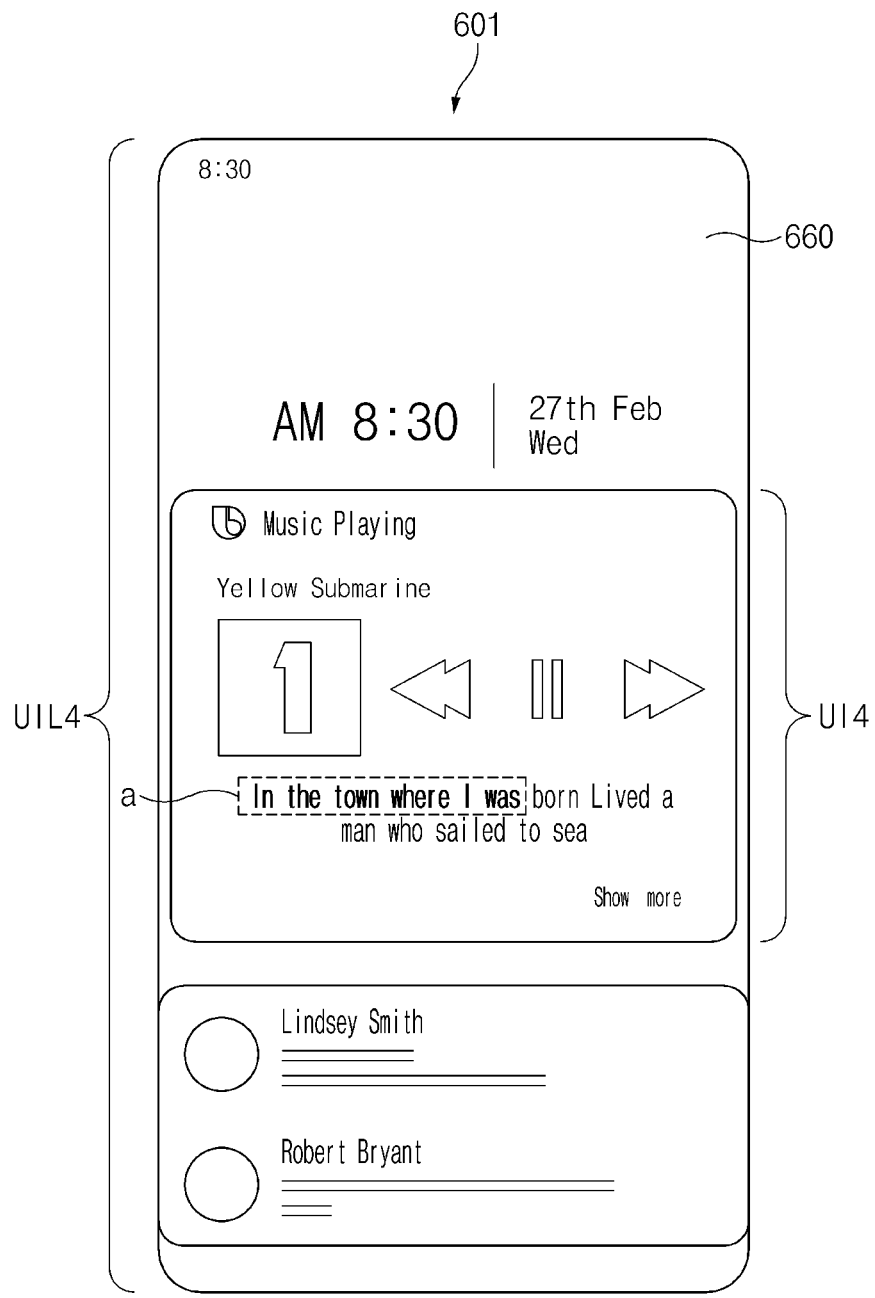
FIG. 7A is a diagram for describing a user interface corresponding to user interface information provided by an electronic device, according to an embodiment of the disclosure.

FIG. 7A is a diagram for describing a user interface corresponding to user interface information provided by an electronic device, according to an embodiment of the disclosure.

Figure 7B:
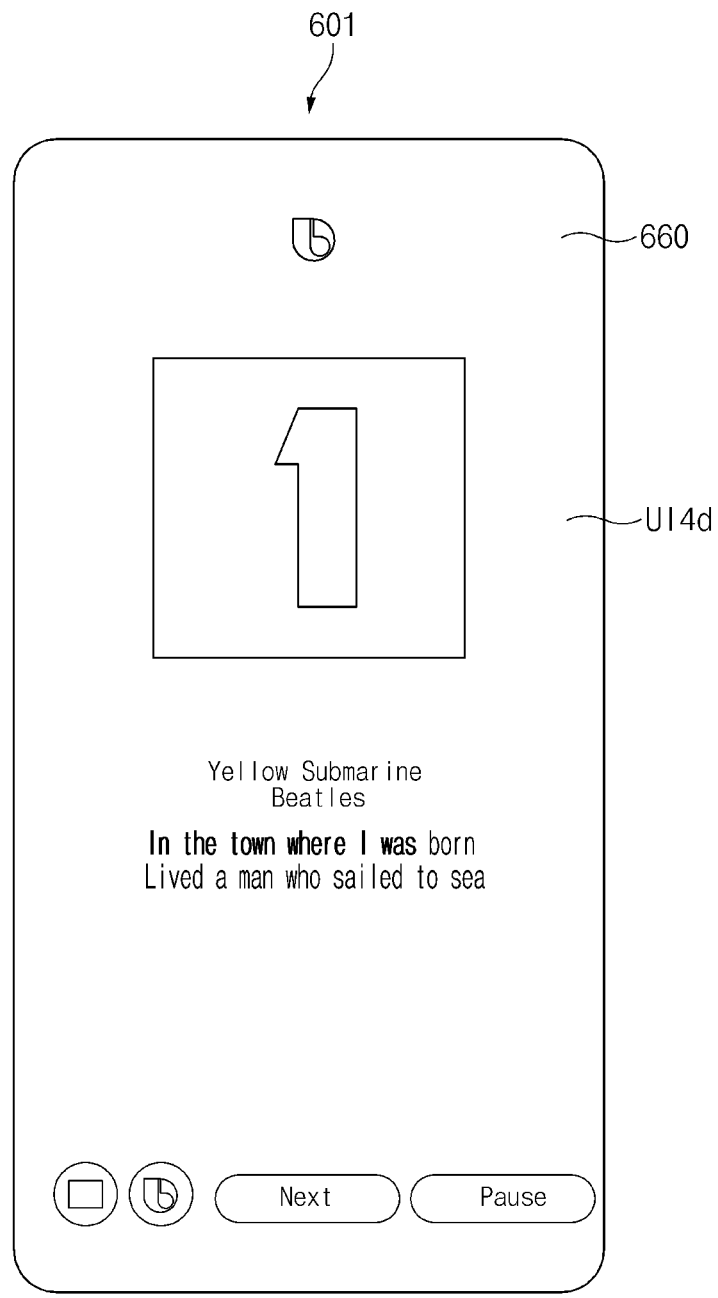
FIG. 7B is a diagram for describing a user interface capable of being provided through a display after a user input for selecting at least part of a fourth user interface of FIG. 7A is input to an electronic device according to an embodiment of the disclosure.

FIG. 7B is a diagram for describing a user interface capable of being provided through a display after a user input for selecting at least part of a fourth user interface UI4 of FIG. 7A is input to the electronic device according to an embodiment of the disclosure.

Referring to FIG. 7A, the display 660 of the electronic device 601 may be in an active state, and the electronic device 601 may be in a state where a first screen UIL4 is displayed through the display 660.

In an embodiment, when music is playing as a response from the first external electronic device 300, the electronic device 601 may provide the fourth user interface UI4, which includes information about the music being played and is used to control the music being played, through the display 660. A lyrics part of the music being played from the first external electronic device 300 may be synchronized and displayed (a) on the fourth user interface UI4. For example, the lyrics part of the music being played from the first external electronic device 300 may be displayed (a) on the fourth user interface UI4 so as to be distinguished from other lyrics parts.

In an embodiment, when the music is played and then stopped as a response from the first external electronic device 300, the electronic device 601 may provide the fourth user interface UI4 including the display (a) of the stopped part through the display 660. For example, the display 660 of the electronic device 601 may be activated within a specified time after the music is played and then stopped as a response from the first external electronic device 300. For example, as a user takes an action of lifting the electronic device 601 and the electronic device 601 detects the action, the display 660 may be activated. Alternatively, for example, as the user presses a physical button for activating the display 660 of the electronic device 601 or applies a touch input to the display 660, the display 660 may be activated. The electronic device 601 may provide the fourth user interface UI4 through the display 660 based on a fact that the display 660 is activated within a specified time after the music is played and then stopped as a response from the first external electronic device 300. Through the synchronization, the electronic device 601 may display (a) the lyrics of a part where the music is played and then stopped as a response from the first external electronic device 300 so as to be distinguished from other lyrics.

Referring to FIG. 7A, the first screen UIL4 may be either a lock screen or a screen provided before a home screen is provided. However, an embodiment is not limited thereto, and the first screen UIL4 of FIG. 7A may be a home screen.

Referring to FIG. 7B, the electronic device 601 may receive a user input for selecting at least part of the fourth user interface UI4. Through the display 660, the electronic device 601 may provide a user interface UI4*d* including details associated with the music, which is a response, in response to a user input. For example, through the user interface UI4*d* including details provided in response to a user input, the electronic device 601 may provide detailed information about the music being played from the first external electronic device 300 through the display 660. In the user interface UI4*d* including details, a lyrics part of the music being played from the first external electronic device 300 may be displayed to be synchronized and distinguished from other lyrics parts.

Referring to FIG. 5B, in operation 1511, the electronic device 601 may execute an application program associated with the response based on a fact that a user input is input.

Figure 8A:
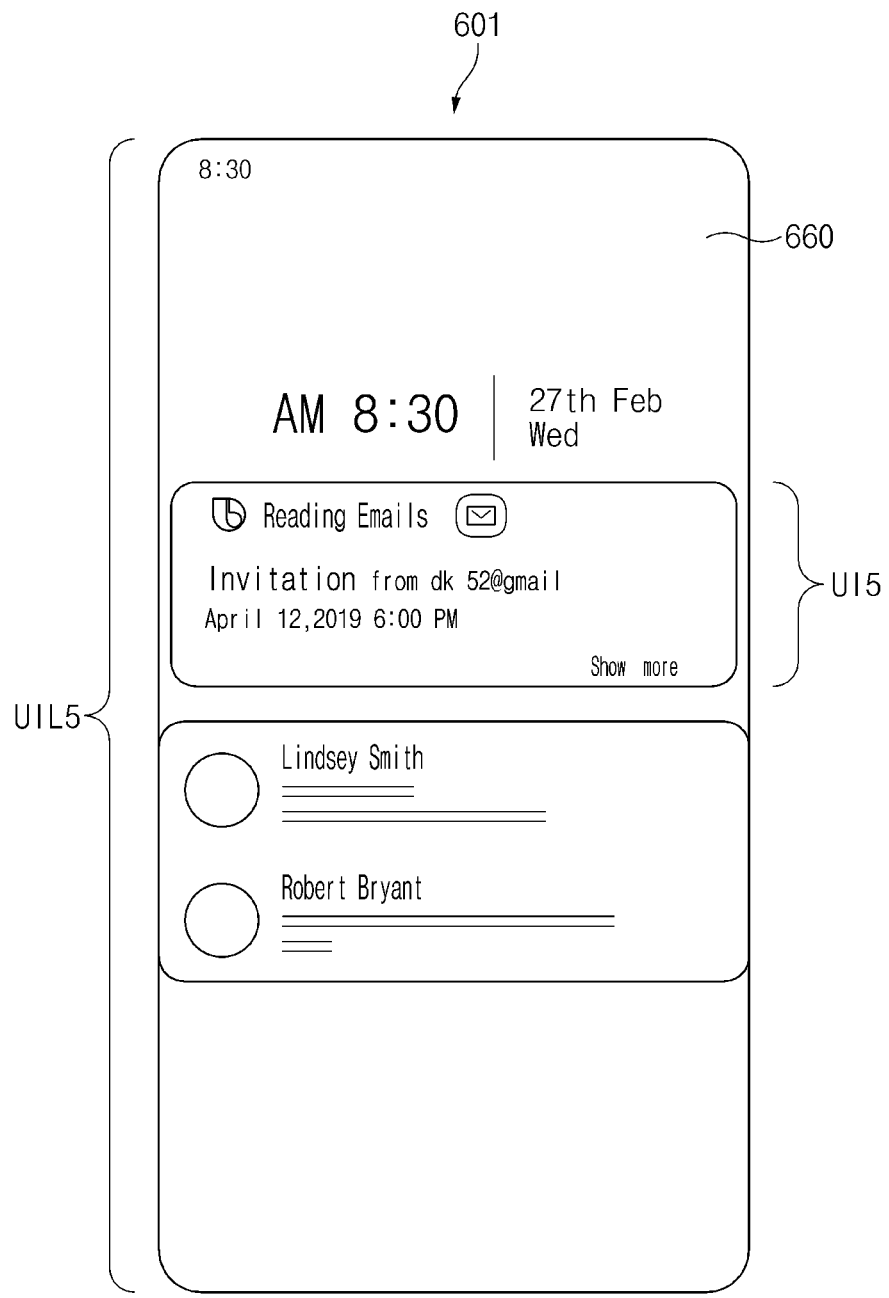
FIG. 8A is a diagram for describing a user interface corresponding to user interface information provided by an electronic device, according to an embodiment of the disclosure.

FIG. 8A is a diagram for describing a user interface corresponding to user interface information provided by an electronic device, according to an embodiment of the disclosure.

Figure 8B:
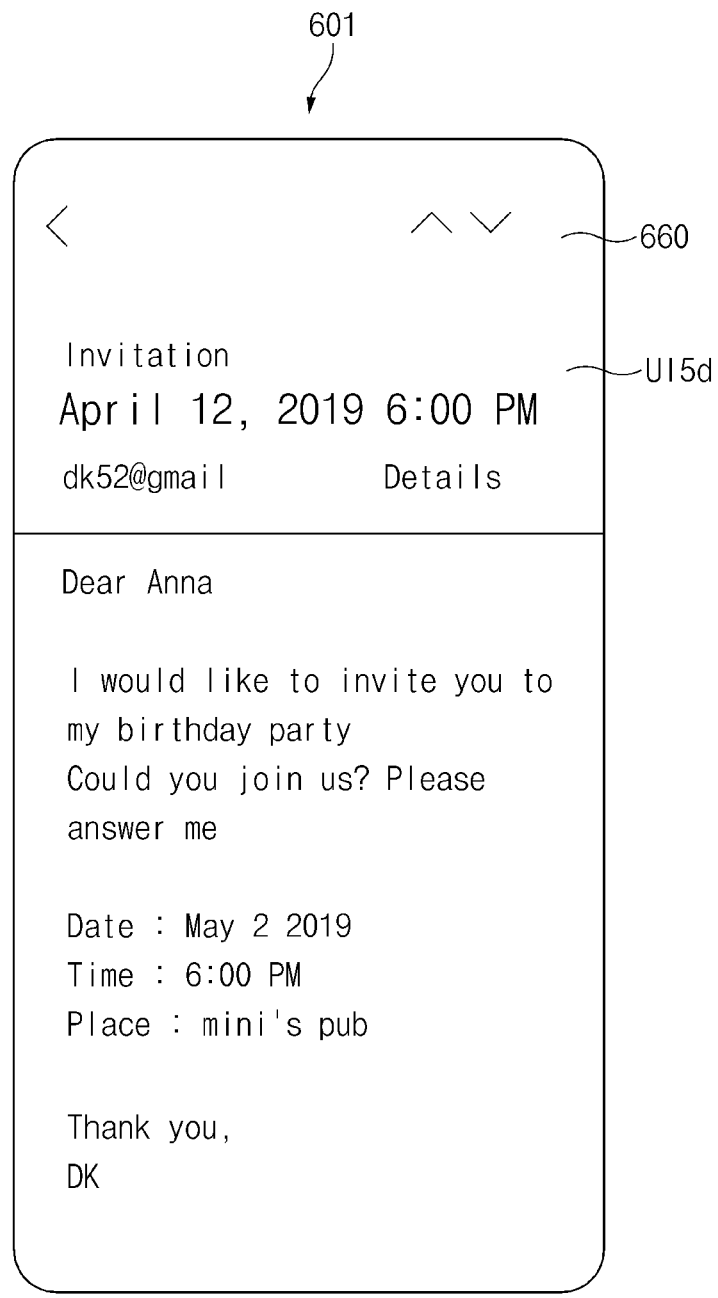
FIG. 8B is a diagram for describing a user interface capable of being provided through a display after a user input for selecting at least part of a fifth user interface of FIG. 8A is input to an electronic device according to an embodiment of the disclosure.

FIG. 8B is a diagram for describing a user interface capable of being provided through a display after a user input for selecting at least part of a fifth user interface UI5 of FIG. 8A is input to an electronic device according to an embodiment of the disclosure.

Referring to FIG. 8A, the display 660 of the electronic device 601 may be in an active state, and the electronic device 601 may be in a state where a first screen UIL5 is displayed through the display 660. In an embodiment in which body content included in an e-mail is output as a response by voice from the first external electronic device 300, the electronic device 601 may provide a fifth user interface UI5 with information about the email being output from the first external electronic device 300 on the first screen UIL5.

Referring to FIG. 8A, the first screen UIL5 may be either a lock screen or a screen provided before a home screen is provided. However, an embodiment is not limited thereto, and the first screen UIL5 of FIG. 8A may be a home screen.

Referring to FIG. 8B, the electronic device 601 may receive a user input for selecting at least part of the fifth user interface UI5. The electronic device 601 may execute an email application program in the electronic device 601 in response to a user input. The electronic device 601 may execute the email application program and then may provide an interface UI5*d* including details of an email being output by voice from the first external electronic device 300 through the display 660. The user may identify the title and/or reception date of the e-mail being output by voice in the first external electronic device 300, through the fifth user interface UI5 on the first screen UIL5. The user may visually identify body content of the email from the interface UI5*d* including details of the email by selecting at least part of the fifth user interface UI5 on the first screen UIL5.

Operation 1501, operation 1503, operation 1505, operation 1507, operation 1509, and operation 1511 of FIG. 5B may correspond to operation 15 of FIG. 4.

Each of the operations of FIGS. 5A and 5B is not limited to the illustrated order. Each operation may be performed simultaneously or may be performed in a different order from that shown.

In an embodiment, all of the operations of FIGS. 5A and 5B may be performed in the electronic device 601 (or the processor 620 in FIG. 2). In this case, operation 1102, operation 1109, and operation 1119 may be omitted.

Hereinafter, an operation of an integrated intelligence system (e.g., the integrated intelligence system 10 of FIG. 2) including an electronic device disclosed in this specification will be described with reference to FIGS. 5A, 5B, and 9. For clarity of description, details the same as the above-described details are omitted.

Figure 9:
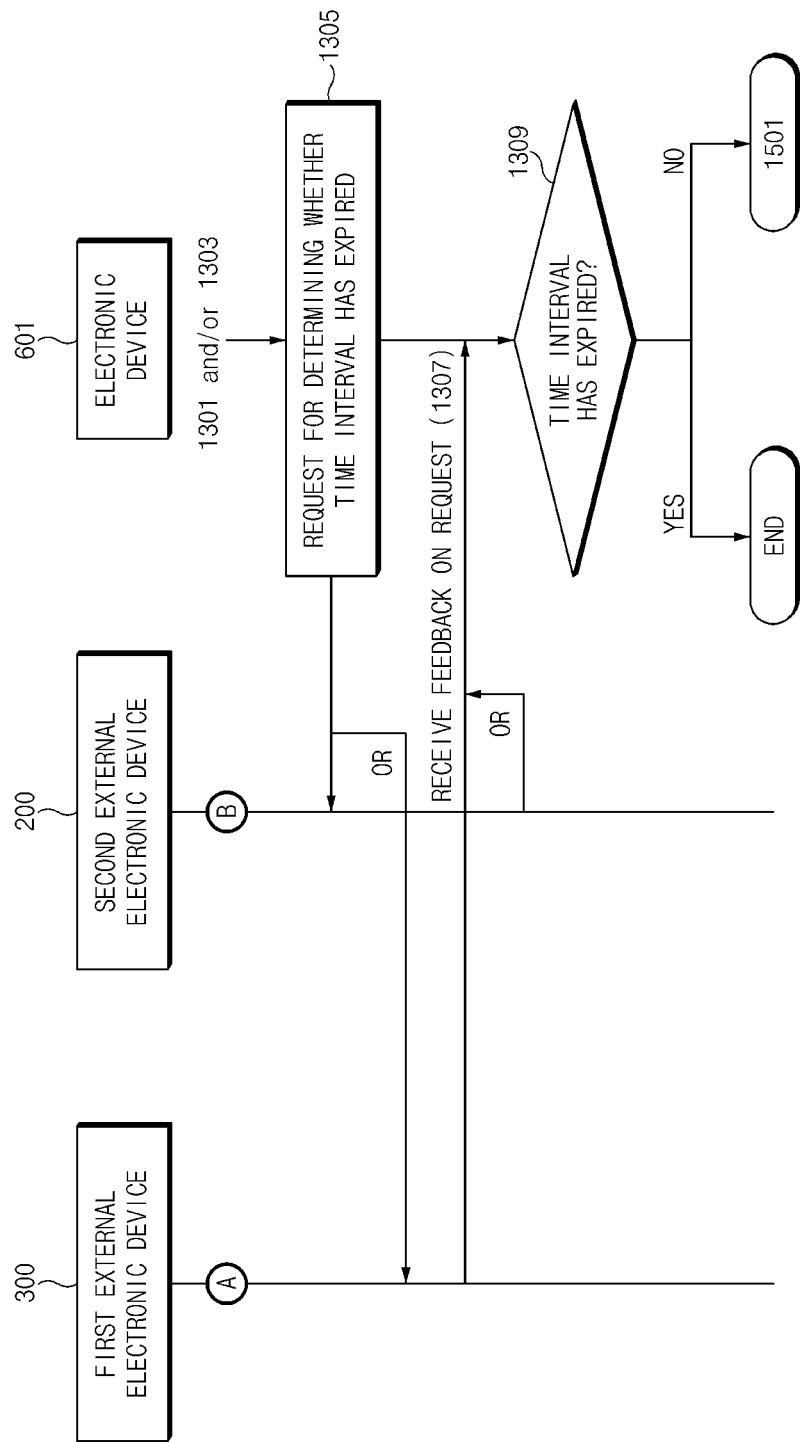
FIG. 9 is a sequence diagram for describing a method for providing a user interface corresponding to a response, according to an embodiment of the disclosure.

FIG. 9 is a sequence diagram for describing a method for providing a user interface corresponding to a response, according to an embodiment of the disclosure.

Referring to FIGS. 5A, 5B, and 9, when it is identified that a display is in an active state within a time interval (e.g., a response time interval or a threshold time interval) in operation 1301 and/or operation 1303, in operation 1305, the electronic device 601 may further determine whether the time interval has expired. For example, the electronic device 601 may transmit a request for determining whether the time interval has expired, to one of the first external electronic device 300 or the second external electronic device 200.

In the case where the electronic device 601 further determines whether the time interval has expired, when a time interval has expired at the time to provide a user interface even though it is identified that the display is in an active state within the time interval (e.g., a response time interval or a threshold time interval), unnecessarily providing a user interface for a response of which the time interval has already expired may be reduced.

In operation 1307, the electronic device 601 may receive feedback on a request transmitted to one of the first external electronic device 300 or the second external electronic device 200 from one of the first external electronic device 300 or the second external electronic device 200.

In operation 1309, the electronic device 601 may determine whether the time interval has expired through the feedback. When the time interval has expired, the electronic device 601 may terminate a process even though it is identified that the display is in an active state within the time interval in operation 1301 and/or operation 1303. When it is identified that the time interval has not expired, the electronic device 601 may perform operation 1501.

Hereinafter, an integrated intelligence system according to an embodiment disclosed in this specification will be described with reference to FIGS. 10A, 10B, and 10C. For clarity of description, details the same as the above-described details are omitted.

Figure 10A:
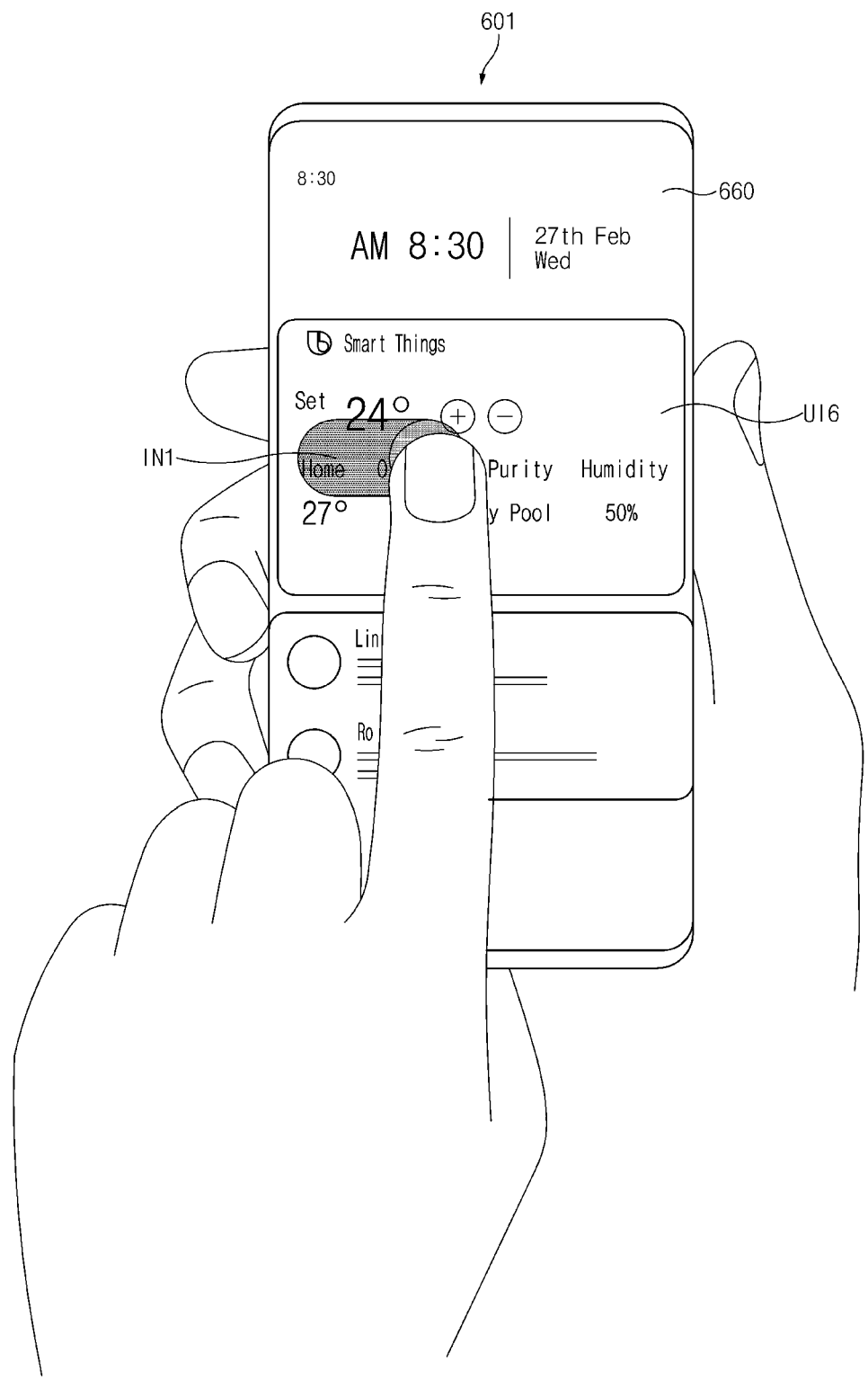
FIG. 10A is a diagram for describing a user interface corresponding to user interface information provided by an electronic device, according to an embodiment of the disclosure.
Figure 10B:
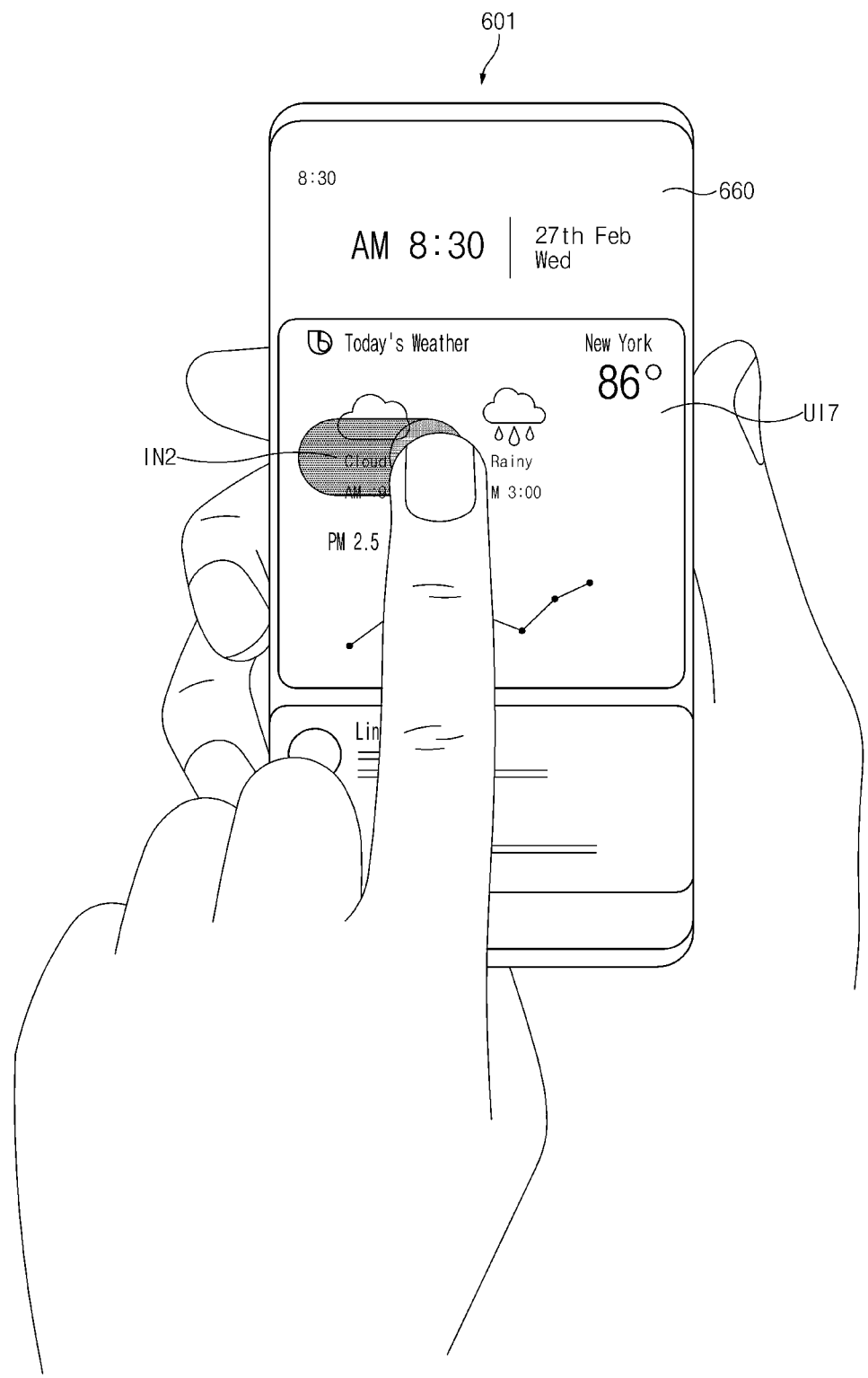
FIG. 10B is a diagram for describing a user interface corresponding to user interface information provided by an electronic device, according to an embodiment of the disclosure.
Figure 10C:
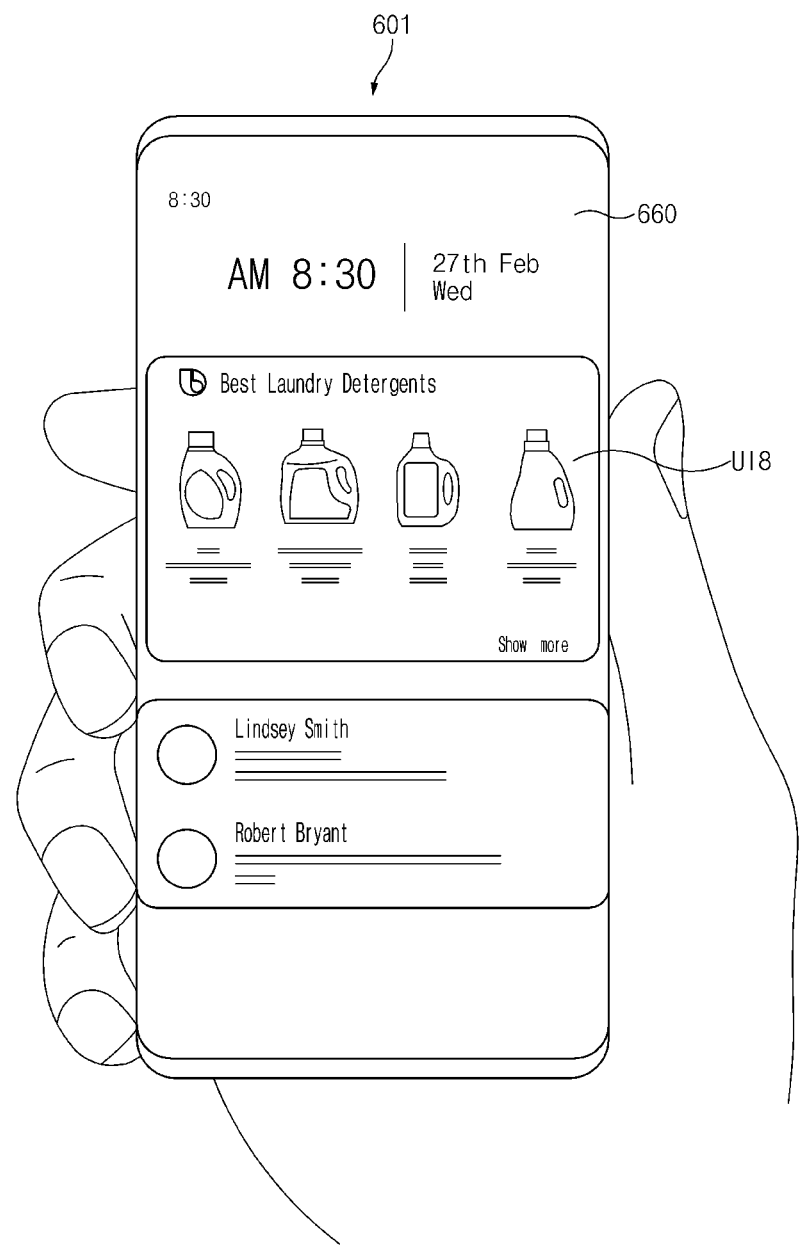
FIG. 10C is a diagram for describing a user interface corresponding to user interface information provided by an electronic device, according to an embodiment of the disclosure.

FIGS. 10A, 10B, and 10C are diagrams for describing a user interface corresponding to user interface information provided by an electronic device, according to various embodiments of the disclosure.

Referring to FIGS. 10A, 10B, and 10C, a second external electronic device (e.g., the second external electronic device 200 of FIG. 2) may further include a history manager module (not shown).

The history manager module may store information about user interfaces provided by the electronic device 601 through the display 660. The history manager module may determine whether there is a history related to an input user utterance before the input user utterance. When the related history is present, the history manager module may transmit, to the electronic device 601, a user interface for the related history as user interface history information together with user interface information associated with a response to the input user utterance.

After the electronic device 601 provides a first user interface (e.g., UI8) associated with a first response through the display 660, the electronic device 601 may have a history of providing a second user interface (e.g., UI7) associated with a second response through the display 660. When a third user utterance is entered as an input, the history manager module may identify first user interface information and second user interface information as a history associated with the third user utterance. The history manager module may generate user interface history information including information about the first user interface and information about the second user interface. The history manager module may transmit the user interface history information to the electronic device 601 together with user interface information and information about a time interval associated with a response to the third user utterance.

On the basis of the user interface history information, the electronic device 601 may provide a sixth user interface UI6 corresponding to user interface information associated with the response to the third user utterance through the display 660. Instead of the sixth user interface UI6, the electronic device 601 may provide the seventh user interface UI7 associated with a response to the second user utterance through the display 660 based on a fact that a user input IN1 is input. Instead of the seventh user interface UI7, the electronic device 601 may provide the eighth user interface UI8 associated with a response to the first user utterance through the display 660 based on a fact that a user input IN2 is input. In an embodiment, the user input IN1 and/or the user input IN2 may associated with a swipe operation.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a display;
   a communication circuit;
   a processor operatively connected to the display and the communication circuit; and
   a memory operatively connected to the processor,
   wherein the memory stores instructions that, when executed, cause the processor to:
   receive information about a time interval that is a time required for a response to a user utterance to be output from a first external electronic device and user interface information which is associated with the response to be output from the first external electronic device, from a second external electronic device through the communication circuit, determine whether the display is in an active state within the time interval, and provide a first user interface corresponding to the user interface information through the display while the response is output by the first external electronic device, based on the determination that the display is in the active state within the time interval, and wherein the instructions further cause the processor to:

before providing the first user interface through the display, transmit a request for determining whether the time interval has expired, to the one of the first external electronic device or the second external electronic device, receive feedback on the request from the one of the first external electronic device or the second external electronic device, determine whether the time interval has not expired based on the feedback, and provide the first user interface corresponding to the user interface information through the display based on the determination that the display is in the active state within the time interval.

2. The electronic device of claim 1, wherein the information about the time interval comprises information about a response time interval, during which the response is output from the first external electronic device, and information about a threshold time interval that is a specified time after the response time interval has expired, and wherein the instructions further cause the processor to:

determine whether the display is in the active state within the response time interval, and determine whether the display is in the active state within the threshold time interval, based on the determination that the display is in an inactive state within the response time interval.

3. The electronic device of claim 1, wherein the instructions further cause the processor to:

determine whether an application program is being executed in the electronic device, based on the determination that the display is in the active state within the time interval, and provide the user interface information and the first user interface corresponding to the application program through the display based on the determination that the application program is being executed.

4. The electronic device of claim 3, wherein the instructions further cause the processor to:

while the application program is executed and an execution screen of the application program is provided through the display, provide the first user interface so as to overlap a part of the execution screen.

5. The electronic device of claim 1, wherein the instructions further cause the processor to:

display the first user interface on a first screen of the electronic device, and provide a second user interface, which is associated with content included in the response and which comprises information corresponding to the user input, through the display, based on a user input for selecting a part of the first user interface, which is input to the electronic device.

6. The electronic device of claim 1, wherein the instructions further cause the processor to:

display the first user interface on a first screen of the electronic device, and execute an application program associated with the response, based on a user input for selecting a part of the first user interface, which is input to the electronic device.

7. The electronic device of claim 1, wherein the instructions further cause the processor to:

after displaying a second user interface on a first screen of the electronic device as the first user interface corresponding to the user interface information, display a third user interface on a first screen of the electronic device, and display the second user interface on the first screen of the electronic device instead of the third user interface, based on a user input to the third user interface, which is input to the electronic device.

8. A method for providing a user interface of an electronic device, the method comprising:

receiving information about a time interval that is a time required for a response to a user utterance to be output from a first external electronic device and user interface information which is associated with the response to be output from the first external electronic device, from a second external electronic device;

determining whether a display of the electronic device is in an active state within the time interval; and providing a first user interface corresponding to the user interface information through the display while the response is output by the first external electronic device, based on the determination that the display is in the active state within the time interval; and before providing the first user interface through the display:

transmitting a request for determining whether the time interval has expired, to the one of the first external electronic device or the second external electronic device; and receiving feedback on the request from the one of the first external electronic device or the second external electronic device, wherein the providing of the first user interface through the display is based on the determination that the time interval has not expired through the feedback.

9. The method of claim 8, wherein the information about the time interval comprises information about a response time interval, during which the response is output from the first external electronic device, and information about a threshold time interval that is a specified time after the response time interval has expired, and wherein the determining of whether the display of the electronic device is in the active state within the time interval comprises:

determining whether the display is in the active state within the response time interval, and determining whether the display is in the active state within the threshold time interval, based on the determination that the display is in an inactive state within the response time interval.

10. The method of claim 8, wherein the providing of the first user interface corresponding to the user interface information through the display based on the determination that the display is in the active state within the time interval comprises:

determining whether an application program is being executed in the electronic device; and providing the user interface information and the first user interface corresponding to the application program through the display based on the determination that the application program is being executed.

11. The method of claim 8, wherein the first user interface is displayed on a first screen of the electronic device, further comprising:

providing a second user interface, which is associated with content included in the response and which comprises information corresponding to the user input, through the display, based on a user input for selecting a part of the first user interface, which is input to the electronic device.

12. The method of claim 8, wherein the first user interface is displayed on a first screen of the electronic device, further comprising:

executing an application program associated with the response, based on a user input for selecting a part of the first user interface, which is input to the electronic device.

13. The method of claim 8, wherein the providing of the first user interface through the display comprises:

after displaying a second user interface on a first screen of the electronic device, displaying a third user interface on the first screen, and further comprising:

displaying the second user interface on the first screen of the electronic device instead of the third user interface, based on a user input to the third user interface, which is input to the electronic device.

\* \* \* \* \*